US012795773B2

(12) United States Patent
Leng et al.

(10) Patent No.: US 12,795,773 B2
(45) Date of Patent: Nov. 10, 2026

(54) RESOURCE ALLOCATION METHOD AND DEVICE

(71) Applicant: GUANGDONG OPPO MOBILE TELECOMMUNICATIONS CORP., LTD., Dongguan (CN)

(72) Inventors: Bingxue Leng, Dongguan (CN); Qianxi Lu, Dongguan (CN); Boyuan Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 328 days.

(21) Appl. No.: 18/396,457

(22) Filed: Dec. 26, 2023

(65) Prior Publication Data

US 2024/0129997 A1 Apr. 18, 2024

Related U.S. Application Data

(63) Continuation of application No. PCT/CN2021/122416, filed on Sep. 30, 2021.

(51) Int. Cl.
*H04W 76/28* (2018.01)
*H04W 92/18* (2009.01)

(52) U.S. Cl.
CPC ............ *H04W 76/28* (2018.02); *H04W 92/18* (2013.01)

(58) Field of Classification Search
CPC ..... H04W 76/28; H04W 92/18; H04W 76/14; H04W 28/18; H04W 76/23
See application file for complete search history.

(56) References Cited

U.S. PATENT DOCUMENTS

| | | | | |
|---|---|---|---|---|
| 2016/0150494 A1* | 5/2016 | Tabet | .................... | H04L 5/0048 370/350 |
| 2022/0174780 A1* | 6/2022 | Bao | .................. | H04W 52/0248 |
| 2022/0174781 A1* | 6/2022 | Yang | ................ | H04W 52/0216 |

(Continued)

FOREIGN PATENT DOCUMENTS

| | | |
|---|---|---|
| CN | 111800894 A | 10/2020 |
| CN | 113382379 A | 9/2021 |

(Continued)

OTHER PUBLICATIONS

TS 38.321, V16.3.0; 3GPP TS; Jan. 6, 2021; Section 5.7 of 38.321 provides a detailed introduction to the Uu port DRX, including DRX configuration parameters, DRX activation conditions, etc; Section 5.22 of 38.321 provides a detailed description of the transmission process on the opposite side link, including sending and receiving behaviors.

(Continued)

*Primary Examiner* — Habte Mered
(74) *Attorney, Agent, or Firm* — Ladas & Parry LLP

(57) ABSTRACT

Provided in the present application are a resource configuration method and a device, which can be applied to a sidelink communication system. The method comprises: a first device sending first information to a second device, wherein the first information comprises assistance information, and the assistance information comprises the value of at least one sidelink DRX parameter that is indicated by the first device. The second device can configure the sidelink DRX parameter for the first device according to the first information.

20 Claims, 6 Drawing Sheets

(56) References Cited

U.S. PATENT DOCUMENTS

| | | | | |
|---|---|---|---|---|
| 2022/0361284 | A1* | 11/2022 | Liu | H04W 52/0216 |
| 2023/0007727 | A1* | 1/2023 | Fan | H04L 1/1896 |
| 2023/0007729 | A1* | 1/2023 | Wang | H04W 76/28 |
| 2023/0062341 | A1* | 3/2023 | Zhou | H04W 76/28 |
| 2023/0199908 | A1* | 6/2023 | Luo | H04W 76/28 370/328 |
| 2025/0358831 | A1* | 11/2025 | Park | H04W 92/18 |
| 2026/0006680 | A1* | 1/2026 | Wang | H04W 76/28 |

FOREIGN PATENT DOCUMENTS

| | | | |
|---|---|---|---|
| CN | 113382380 | A | 9/2021 |
| CN | 114390598 | A | 4/2022 |
| WO | 2021119474 | A1 | 6/2021 |
| WO | 2021147597 | A1 | 7/2021 |

OTHER PUBLICATIONS

TS 38.331, V16.3.1; 3GPP TS; Jan. 7, 2021; Section 5.8 of section 38.331 introduces the interaction process between the network and UE.

Huawei et al. Consultation on the sidelink DRX for unicast, groupcast, and broadcast 3GPP TSG-RAN WG2 Meeting # 112electronic R2-2009413, Nov. 13, 2020 (Nov. 13, 2020), full text.

International Search Report and Written Opinion, International Application No. PCT/CN2021/122416, mailed Jun. 23, 2022 (16 pages).

* cited by examiner

RESOURCE ALLOCATION METHOD AND DEVICE

CROSS-REFERENCE TO RELATED APPLICATIONS

The present disclosure is a continuation-application of International (PCT) Patent Application No. PCT/CN2021/122416, filed on Sep. 30, 2021, the entire contents of which are hereby incorporated by reference in their entirety.

TECHNICAL FIELD

The present disclosure relates to the field of communication technologies, and in particular to a resource allocation method, a device, and a storage medium.

BACKGROUND

An existing sidelink communication system supports unicast sidelink discontinuous reception (sidelink DRX, also SL DRX) configuration. In the unicast SL DRX configuration, a receiver terminal (i.e., the terminal that receives the SL DRX configuration) receives the SL DRX configuration from a sender terminal (i.e., the terminal that sends the SL DRX configuration), and the receiver terminal can reject the SL DRX configuration. How to improve a success rate of the SL DRX configuration is a problem that needs to be solved.

SUMMARY OF THE DISCLOSURE

The present disclosure provides a resource allocation method and a device.

In a first aspect, the present disclosure provides a resource allocation method, performed by a first device and comprising: sending a first information to a second device; wherein the first information comprises an assistance information, the assistance information comprising at least one sidelink discontinuous reception (DRX) parameter indicated by the first device; the first information is configured for the second device or a network device to configure a sidelink DRX parameter for the first device.

In a second aspect, the present disclosure provides a resource allocation method, performed by a second device and comprising: receiving a first information from a first device; wherein the first information comprises an assistance information, the assistance information comprising at least one sidelink discontinuous reception (DRX) parameter indicated by the first device; the first information is configured for the second device or a network device to configure a sidelink DRX parameter for the first device.

In a third aspect, the present disclosure provides a first device, comprising: a transceiver, a processor, and a memory; wherein the memory stores a computer-executable instruction; the processor is configured to execute the computer-executable instruction stored in the memory, to be caused to perform the method in the first aspect.

DETAILED DESCRIPTION

Figure 1:
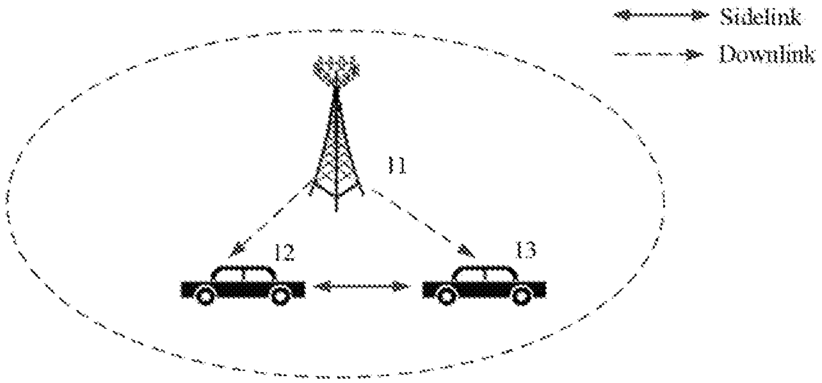
FIG. 1 is a schematic view of an application scenario I according to some embodiments of the present disclosure.

The technical solutions in the present disclosure will be described below in conjunction with the accompanying drawings.

The information transmission method provided in the present disclosure may be applied to various communication systems, such as: a long term evolution (LTE) system, an LTE frequency division duplex (FDD) system, an LTE time division duplex (TDD), a universal mobile telecommunication system (UMTS), a worldwide interoperability for microwave access (WiMAX) communication system, a fifth generation (5G) mobile communication system or new radio access technology (NR). The 5G mobile communication system may include a non-standalone (NSA) network and/or a standalone (SA) network.

The information transmission method provided in the present disclosure may further be applied to machine type communication (MTC), long term evolution-machine (LTE-M), device to device (D2D) network, machine to machine (M2M) network, internet of things (IoT) network, or other networks. The IoT network may, for example, include Internet of Vehicles (IoV). The communication methods in the IoV system are collectively referred to as vehicle to other devices (vehicle to X, V2X, where X may represent anything). For example, the V2X may include: vehicle to vehicle (V2V) communication, vehicle to infrastructure (V2I) communication, vehicle to pedestrian (V2P) communication, or vehicle to network (V2N) communication, etc.

The information transmission method provided in the present disclosure may further be applied to future communication systems, such as a 6th generation mobile communication system, without limitation herein.

In the embodiments of the present disclosure, the terminal device may also be referred to as a user equipment (UE), an access terminal, a user unit, a user station, a mobile station, a mobile platform, a remote station, a remote terminal, a mobile device, a user terminal, a terminal, a wireless communication device, a user agent, or a user device.

The terminal device may be a device that provides voice/data connectivity to a user, e.g., a handheld device, an in-vehicle device, etc. with wireless connectivity. Currently, some examples of the terminal may be: a mobile phone, a tablet computer (pad), a computer (e.g., laptop, PDA, etc.) with wireless transceiver functionality, a mobile internet device (MID), a virtual reality (VR) device, an augmented reality (AR) device, a wireless terminal in industrial control, a wireless terminal in self-driving, a wireless terminal in remote medical, a wireless terminal in smart grid, a wireless terminal in transportation safety, a wireless terminal in smart city, a wireless terminal in smart home, a cellular telephone, a cordless telephone, a session initiation protocol (SIP) telephone, a wireless local loop (WLL) station, a personal digital assistant (PDA), handheld devices, computing devices with wireless communication capabilities, or other processing devices connected to a wireless modem, an in-vehicle device, a wearable device, a terminal device in a 5G network, or a terminal device in a future evolved public land mobile network (PLMN).

Among them, the wearable device may also be called a wearable smart device, which is a general term for the application of wearable technology to intelligentize daily wear and develop wearable devices, such as glasses, gloves, watches, clothing, and shoes. The wearable device is a portable device that can be worn directly on the body or integrated into the user's clothing or accessories. The wearable device is not only a hardware device, but also can realize powerful functions through software support as well as data interaction and cloud interaction. Broadly speaking, the wearable smart device includes full-featured, large-sized devices that do not rely on smartphones to achieve complete or partial functionality, such as smartwatches or smart glasses, etc., as well as those that focus on a certain type of application functionality and is required to be used in conjunction with other devices such as smartphones, such as various types of smart bracelets and smart jewelry for monitoring physical signs.

In addition, the terminal device may be a terminal device in the Internet of things (IoT) system. IoT is an important part of the future development of information technology, and its main technical characteristic is to connect items with the network through communication technology, so as to realize an intelligent network with human-machine interconnection and thing-thing interconnection. IoT technology may be achieved through, for example, a narrow band (NB) technology, to achieve massive connectivity, deep coverage, and terminal power saving.

In addition, the terminal device may include sensors such as a smart printer, a train detector, a gas station, etc., and the main functions thereof include collecting data (for some terminal devices), receiving control information and downlink data from a network device, and sending electromagnetic waves to transmit uplink data to the network device.

In the embodiments of the present disclosure, the network device may be any kind of device with wireless transceiver function. The network device includes, but is not limited to: evolved Node B (eNB), radio network controller (RNC), Node B (NB), base station controller (BSC), base transceiver station (BTS), home base station (e.g., home evolved NodeB, or home Node B, HNB), baseband unit (BBU), access point (AP) in a wireless fidelity (Wi-Fi) system, wireless relay node, wireless backhaul node, transmission point (TP), or transmission and reception point (TRP), etc., gNB or transmission point (TRP or TP) in a 5G, e.g., NR, system, an antenna panel for one or a group (including multiple antenna panels) of a base station in the 5G system, or, network node that constitutes a gNB or a transmission point, e.g., a baseband unit (BBU) or a distributed unit (DU), and the like.

In some deployments, the gNB may include a centralized unit (CU) and a DU. The gNB may further include an active antenna unit (AAU). The CU implements some of the functionality of the gNB, and the DU implements some of the functionality of the gNB. For example, the CU may be responsible for handling non-real-time protocols and services, e.g., realizing the functions of radio resource control (RRC) layer, service data adaptation protocol (SDAP) layer, and/or packet data convergence protocol (PDCP) layer; the DU may be responsible for handling physical layer protocols and real-time services, e.g., realizing the functions of radio link control (RLC) layer, media access control (MAC) layer, and physical (PHY) layer. One DU can be connected to only one CU or to multiple CUs, while one CU can be connected to multiple DUs. The CU may communicate with the DU through the F1 interface. The AAU can realize some of the physical layer processing functions, RF processing, and active antenna related functions. Since the RRC layer information is eventually handed over to the PHY layer and thus becomes PHY layer information, or, is transformed from PHY layer information, in this architecture, high-level signaling, such as RRC layer signaling, can also be considered to be sent by DU, or, by DU and AAU.

It can be understood that the network device may be a device including one or more of a CU node, a DU node, and an AAU node. In addition, the CU may be classified as a network device in a radio access network (RAN), or the CU may be classified as a network device in a core network (CN), which is not limited by the present disclosure.

The network device provides services for the cell, and the terminal device communicates with the cell through transmission resources (e.g., frequency domain resources, or to say, spectrum resources) allocated by the network device. The cell may belong to a macro base station (e.g., a macro eNB or a macro gNB, etc.), or may belong to a base station corresponding to a small cell, where the small cell herein may include: metro cell, micro cell, pico cell, femto cell, etc. These small cells are characterized by a small coverage area, low transmit power, etc., and are suitable for providing a high-speed rate data transmission service.

To facilitate the understanding of the embodiments of the present disclosure, the following points are made.

In the embodiments of the present disclosure, the terms "system" and "network" are often used interchangeably herein. The term "and/or" merely describes an association relationship of associated objects, and indicates that three kinds of relationships may exist, e.g., A and/or B, which may be expressed as A alone, both A and B, and B alone. In addition, the character "/" herein generally indicates that the associated objects are in an "or" relationship.

The terms used in the embodiments of the present disclosure are intended only to explain specific embodiments of the present disclosure and are not intended to limit the present disclosure. The terms "first", "second", "third", "fourth", etc. in the specification, claims, and described drawings of the present disclosure are intended to distinguish between different objects and not to describe a particular order. In addition, the terms "including" and "having", and any variations thereof, are intended to cover non-exclusive inclusion.

References to "instruction" in the embodiments of the present disclosure may be direct instruction, indirect instruction, or an indication of an associative relationship. For example, A instructing B may mean that A instructs B directly, such as B can be accessed through A; or that A instructs B indirectly, such as A instructs C and B can be accessed through C; or that there is an associative relationship between A and B.

In the embodiments of the present disclosure, the terms "corresponding" may indicate a direct or indirect corresponding relationship between the two, or an associated relationship between the two, or a relationship between instructing and being instructed, or configuring and being configured.

In the embodiments of the present disclosure, "predefined" or "pre-configured" may be realized by storing a corresponding code, form, or other means that can indicate relevant information in advance in a device (e.g., including a terminal device and a network device), and the present disclosure does not limit the specific ways of realization. For example, "predefined" may mean being defined in a protocol.

In the embodiments of the present disclosure, the "protocol" may refer to standard protocols in the field of communication, for example, LTE protocol, NR protocol, and relevant protocols applied in future communication systems, and the present disclosure does not limit in this regard.

In order to facilitate the understanding of the embodiments of the present disclosure, the application scenarios of the embodiments of the present disclosure are first described.

FIG. 1 is a schematic view of an application scenario I according to some embodiments of the present disclosure. The scenario shown in FIG. 1 includes a network device 11 and two terminal devices 12 and 13, and both the terminal device 12 and terminal device 13 are in a coverage area of network device 11. The network device 11 is communicatively connected to the terminal device 12 and the terminal device 13, respectively, and the terminal device 12 is communicatively connected to the terminal device 13. Exemplarily, the terminal device 12 may send a communication message to the terminal device 103 through the network device 11, and the terminal device 12 may send a communication message directly to the terminal device 13. A link for direct communication between the terminal device 12 and the terminal device 13 is referred to as a D2D link, which may also be referred to as a proximity service (ProSe) link, a sidelink, etc. Transmission resources on the D2D link may be allocated by the network device.

Figure 2:
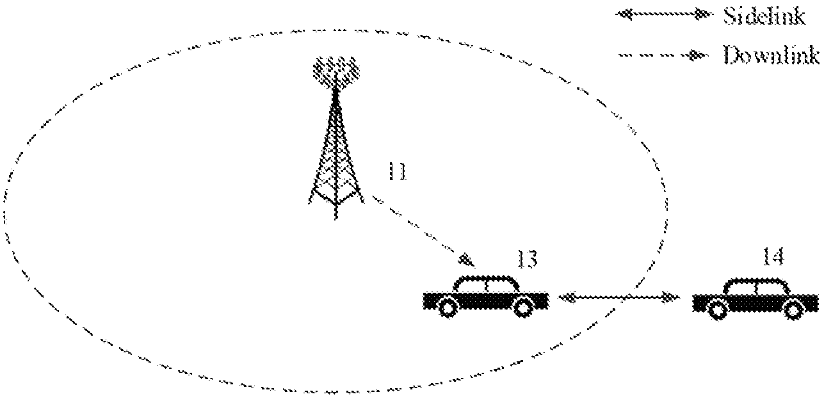
FIG. 2 is a schematic view of an application scenario II according to some embodiments of the present disclosure.

FIG. 2 is a schematic view of an application scenario II according to some embodiments of the present disclosure. The scenario shown in FIG. 2 includes a network device 11 and two terminal devices, and unlike FIG. 1, the terminal device 13 is within the coverage area of the network device 11 and the terminal device 14 is outside the coverage area of the network device 11. The network device 11 is communicatively connected to the terminal device 13, and the terminal device 13 is communicatively connected to the terminal device 14. Exemplarily, the terminal device 13 may receive configuration information sent by the network device 11 and perform sidelink communication according to the configuration information. Since the terminal device 14 cannot receive the configuration information sent by the network device 11, the terminal device 14 may perform the sidelink communication according to pre-configuration information and information carried in a physical sidelink broadcast channel (PSBCH) sent by the terminal device 13.

Figure 3:
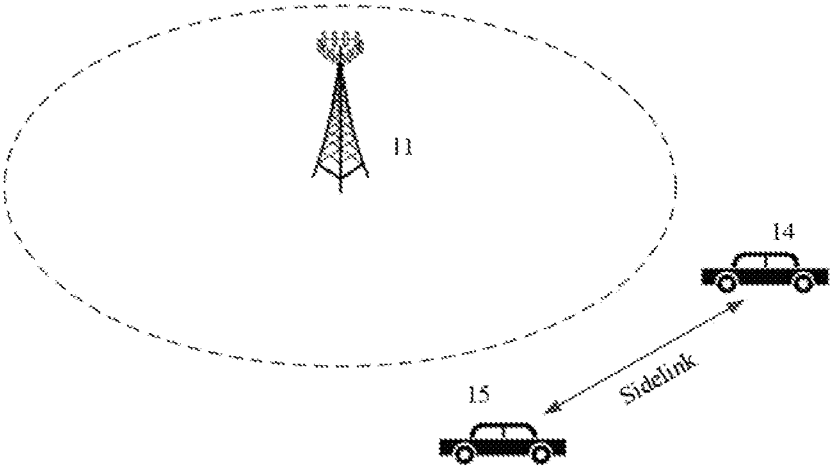
FIG. 3 is a schematic view of an application scenario III according to some embodiments of the present disclosure.

FIG. 3 is a schematic view of an application scenario III according to some embodiments of the present disclosure. In the scenario shown in FIG. 3, both the terminal device 14 and the terminal device 15 are outside the coverage area of the network device 11. Both the terminal device 14 and the terminal device 15 may determine a sidelink configuration according to pre-configuration information and perform sidelink communication.

Figure 4:
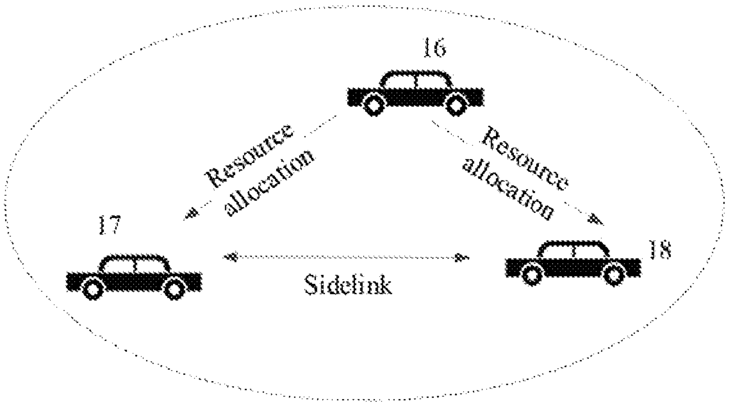
FIG. 4 provides a schematic view of an application scenario IV according to some embodiments of the present disclosure.

FIG. 4 provides a schematic view of an application scenario IV according to some embodiments of the present disclosure. In the scenario shown in FIG. 4, multiple terminal devices form a communication group, such as terminal devices 16, 17, and 18 forming the communication group. The communication group has a central control node, which may also be referred to as a cluster header (CH), such as the terminal device 16. The central control node has one of the following functions: being responsible for the establishment of the communication group; adding and discharging members of the group; carrying out resource coordination, allocating sidelink transmission resources for other terminals, and receiving sidelink feedback from other terminals; carrying out resource coordination with other communication groups, etc.

It is to be noted that the system architecture and the application scenarios described in the embodiments of the present disclosure are for the purpose of more clearly illustrating the technical solutions of the embodiments of the present disclosure, and do not constitute a limitation on the technical solutions provided in the embodiments of the present disclosure. Those skilled in the art may know that, with the evolution of the network architecture and the emergence of new business scenarios, the technical solutions provided in the embodiments of the present disclosure are equally applicable to similar scenarios.

Unlike the traditional cellular system in which communication data is received or sent through a base station, D2D communication introduces sidelink transmission technology and adopts terminal-to-terminal direct communication, thereby providing higher frequency efficiency as well as lower transmission latency. The 3rd Generation Partnership Project (3GPP) defines two transmission modes: first transmission mode and second transmission mode.

First transmission mode: The transmission resources of the terminal device are allocated by the base station, and the terminal device transmits data on the sidelink according to the resources allocated by the base station. The base station may allocate resources for a single transmission for the terminal device, or may allocate resources for a semi-static transmission for the terminal device.

Exemplarily, the terminal device 12 shown in FIG. 1 is located within the coverage area of the network device 11, and the network device 11 allocates transmission resources for sidelink transmission for the terminal device 12.

Second transmission mode: the terminal device selects a resource in a resource pool for data transmission.

Exemplarily, the terminal device 12 shown in FIG. 1 may autonomously select a transmission resource in the resource pool configured by the network for sidelink transmission. The terminal devices 14 and 15 shown in FIG. 3 are both located outside the coverage area of the network device 11, and the terminal devices 14 and 15 may autonomously select a transmission resource in the pre-configured resource pool for sidelink transmission.

In 3GPP, the research on D2D mainly includes the following stages:

1) Proximity service (ProSe): research has been carried out for the public safety class of the ProSe scenario. In ProSe, by configuring the position of resource pools in the time domain, for example, configuring the resource pools to be discontinuous in the time domain, discontinuous sending/receiving of data of the terminal device on the road may be achieved, so as to achieve the effect of power saving.
2) V2X: Vehicle-to-vehicle communication scenarios for Vehicle Networking have been studied, which are mainly oriented to the relatively high-speed movement of vehicle-to-vehicle and human-to-vehicle communication services. In V2X, power efficiency is not the main problem because the vehicle system can be continuously powered, while the delay of data transmission is the main problem. Therefore, the terminal device is required to send and receive continuously in the system design.
3) Further enhancements to LTE device to device (FeD2D): research has been carried out for wearable devices to access the network through mobile phones, which is mainly oriented to the scenario of low mobile speed and low power access. In FeD2D, in the pre-study stage, 3GPP concluded that the base station can configure DRX parameters of a remote terminal (remote UE) through a relay terminal (relay UE). However, since the subject has not further entered the standardization stage, the specific details of how to carry out DRX configuration are inconclusive.

NR-V2X is a communication scenario based on sidelink for communication. In NR-V2X communication, X can refer generically to any device with wireless receiving and transmitting capabilities, including but not limited to slow-moving wireless devices, fast-moving vehicle-mounted devices, and network control nodes with wireless transmitting and receiving capabilities.

NR-V2X communication supports unicast, multicast, and broadcast transmission. For unicast transmission, a sending terminal sends data and there is only one receiving terminal. For multicast transmission, the sending terminal sends data, and the receiving terminals are all the terminals within a communication group or within a certain transmission distance. For broadcast transmission, the sending terminal sends data and the receiving terminal is any terminal around the sending terminal.

Similar to LTE V2X, the NR V2X defines the two transmission modes described above.

Unlike LTE V2X, in addition to the feedback-free, UE-initiated hybrid automatic repeat request (HARQ), NR V2X introduces feedback-based HARQ retransmission, i.e., the sending device can determine whether data retransmission is required based on the feedback information from the receiving device. The feedback-based HARQ retransmission is not limited to unicast communication, but also includes multicast communication.

Same as LTE V2X, in the NR V2X, the power efficiency is not the main problem because the vehicle system can be continuously powered, while the delay of data transmission is the main problem. Therefore, the terminal device is required to send and receive continuously in the system design.

In wireless networks, when there is data to be transmitted, the UE is required to listen to the physical downlink control channel (PDCCH) all the time, and send and receive data according to an instruction message sent by the network side, such that the power consumption of the UE and the delay of the data transmission are relatively large. Therefore, the 3GPP standard protocol introduces a discontinuous reception (DRX) energy saving strategy.

The basic mechanism of DRX is to configure a DRX cycle for the UE in RRC_CONNECTED state. The DRX cycle consists of “On Duration” and “Opportunity for DRX”. The DRX cycle consists of “On Duration” and “Opportunity for DRX”: during the “On Duration” time (also known as active time), the UE listens and receives the PDCCH; during the “Opportunity for DRX” time (also known as inactive time), the UE does not receive the PDCCH to reduce power consumption. The “Opportunity for DRX” time can also be called “DRX off duration” compared to “DRX on duration”.

In DRX operation, the terminal controls the active time and inactive time of the terminal according to some timer parameters configured by the network. For example, when the UE receives a PDCCH from the network scheduling the UE during the On Duration period, the UE activates a timer, such as drx_inactiveTimer, and the terminal is in an active state until the timer expires.

The UE monitors the PDCCH discontinuously according to the DRX configuration for power saving purposes, and when the PDCCH carries C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI, the UE will conduct the corresponding DRX operation according to the control information.

The network controls the DRX behavior of the UE by configuring a series of parameters, which (Uu DRX parameters) include:

drx-onDurationTimer, drx-SlotOffset, drx-InactivityTimer, drx-RetransmissionTimerDL, drx-RetransmissionTimerUL, drx-LongCycleStartOffset, drx-ShortCycle (optional): the Short DRX cycle, drx-ShortCycleTimer (optional), HARQ-RTT-TimerDL, drx-HARQ-RTT-TimerUL, ps-Wakeup (optional), ps-TransmitOtherPeriodicCSI (optional), ps-TransmitPeriodicL1-RSRP (optional).

Among them, the UE will be in DRX-active state when at least one of the following cases is met:

1. during operation of drx-onDurationTimer or drx-InactivityTimer;
2. during operation of drx-RetransmissionTimerDL or drx-RetransmissionTimerUL;
3. during operation of ra-ContentionResolutionTimer or msgB-ResponseWindow;
4. there is an unprocessed resource scheduling request (SR);
5. the PDCCH indicates that there is a new transmission period.

In the listening process of NR V2X, the terminal is required to continuously listen for resources to determine which resources are available, and the terminal consumes too much energy. In order to achieve power saving, DRX mechanism is introduced in the sidelink system. Similar to the DRX mechanism of the Uu interface described above, the terminal receives data sent by other terminals within the On duration range, and when no data is detected, it enters the inactive state within the DRX off duration range to save power; when the data sent to the terminal by other terminals is detected, the terminal activates a timer, and the terminal is in the active state until the timer expires.

Figure 5:
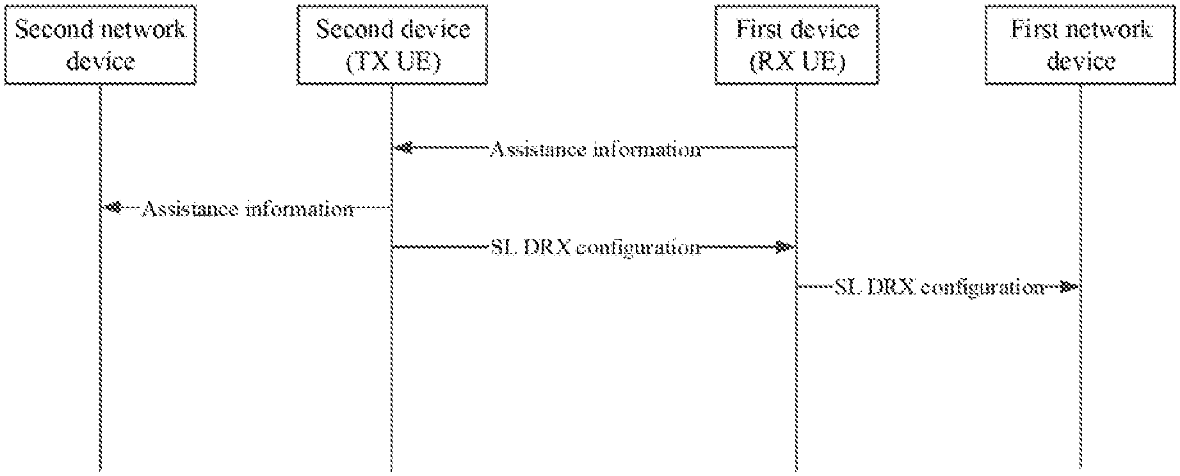
FIG. 5 is a flowchart of sidelink resource allocation according to some embodiments of the present disclosure.

FIG. 5 is a flowchart of sidelink resource allocation according to some embodiments of the present disclosure. A first device and a second device shown in FIG. 5 are two sidelink devices in direct communication. The first device is a receiver UE (RX UE), i.e., a UE that receives data or signaling, and the second device is a transmitter UE (TX UE), i.e., a UE that transmits data or signaling. The first network device is a network device to which the first device belongs, and the second network device is a network device to which the second device belongs.

As shown in FIG. 5, the first device sends assistance information to the second device, and when the second device is in a connected state, the second device will report the assistance information to the second network device after receiving the assistance information from the first device. The second device or the second network device configures a sidelink DRX parameter for the first device, and the assistance information is taken into account in the configuration. The second device sends the sidelink DRX configuration to the first device, or, the second network device sends the sidelink DRX configuration to the first device through the second device, and the first device accepts or rejects the sidelink DRX configuration. When the first device is in a connected state, the first device reports the sidelink DRX configuration to the first network device.

The above sidelink DRX configuration has the following problems.

First, the first device does not know the data information (i.e., information such as traffic pattern) sent from the second device, and thus cannot accurately derive the sidelink DRX configuration parameter that match the sent data.

Second, after the first device rejects the sidelink DRX configuration, when the two parties have not been able to agree on the sidelink DRX configuration, the first device has to continuously listen, resulting in excessive energy consumption.

The embodiments of the present disclosure propose a resource allocation method. Considering that the first device is unaware of the data information sent from the second device, when the first device sends assistance information to the second device, a situation of values of at least one sidelink DRX parameter that can be accepted by the first device may be indicated, such as a value set or a value range. The assistance information may indicate a situation of value of each of the at least one sidelink DRX parameter, or may indicate situations of values of multiple sets of sidelink DRX parameters, each set including at least one sidelink DRX parameter. Based on the above setting of the content of the assistance information, the first device may effectively assist the second device in configuring the sidelink DRX parameters for the second device without being aware of the data information sent from the second device, so as to improve the success rate of the sidelink DRX configuration. Further, in order to reduce the power consumption of the first device, a timer or a counter may be set to control the maximum number of times or the maximum duration of the sidelink resource configuration to meet the power saving needs of the first device.

The technical solutions provided by the embodiments of the present disclosure are described in detail below by means of specific embodiments. It is noted that the technical solution provided by the embodiments of the present disclosure may include some or all of the following, and these following several specific embodiments may be combined with each other, and the same or similar concepts or processes may not be repeated in certain embodiments.

It should be noted that in the following embodiments, the first device is a receiver UE (RX UE), i.e., a UE that receives the sidelink DRX configuration, and the second device is a transmitter UE (TX UE), i.e., a UE that sends the sidelink DRX configuration.

Embodiment I

Figure 6:
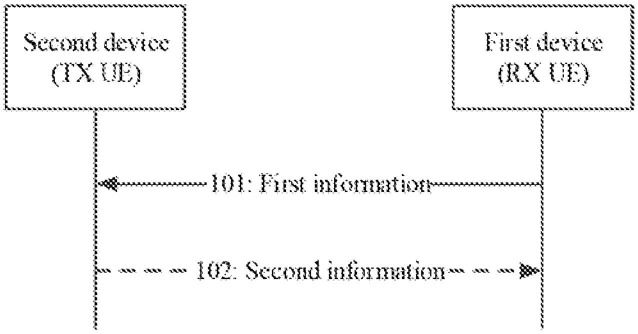
FIG. 6 is a flowchart of a resource allocation method according to some embodiments of the present disclosure.

FIG. 6 is a flowchart of a resource allocation method according to some embodiments of the present disclosure. As shown in FIG. 6, the resource configuration method provided by the present embodiment includes the following steps.

Step 101: sending, by a first device, a first information to a second device.

Step 102, sending, by the second device, a second information to the first device. (Optional)

In the embodiments, the first information is configured for the second device or a network device to configure a sidelink DRX parameter for the first device, and the network device herein refers to a network device to which the second device belongs. The second information includes the sidelink DRX parameter configured by the second device or the network device for the first device.

Specifically, the step 102 includes the following two implementations.

In one possible implementation, the second device configures the sidelink DRX parameter for the first device according to the first information, and the second device sends the second information to the first device, the second information including the sidelink DRX parameter configured by the second device for the first device.

In another possible implementation, the second device sends the first information to the network device to configure the sidelink DRX parameter for the first device according to the first information, and the second device sends the second information to the first device, the second information including the sidelink DRX parameter configured by the network device for the first device.

In some embodiments, the first information includes assistance information, the assistance information including at least one sidelink discontinuous reception (sidelink DRX) parameter indicated by the first device.

In some embodiments, the assistance information includes the at least one sidelink DRX parameter indicated by the first device, including: the assistance information includes a value range of the at least one sidelink DRX parameter indicated by the first device. In the embodiments, each sidelink DRX parameter is individually configured. For example, Parameter1=valueRange1, Parameter2=valueRange2, and so on.

In some embodiments, the assistance information includes the at least one sidelink DRX parameter indicated by the first device, including: the assistance information includes a value range or a value of each sidelink DRX parameter among each of multiple sets of sidelink DRX parameters indicated by the first device. In the embodiments, the sidelink DRX parameters are configured in combination. Accordingly, the second device or the network device selects one of the sets of sidelink DRX parameters and configures the at least one sidelink DRX parameter for the first device according to the value range of or value of the set of sidelink DRX parameters.

Exemplarily, the assistance information includes DesiredDRXSL1={Parameter1value1, Parameter2 value2 . . . }, DesiredDRXSL2={Parameter1value3, Parameter2value4 . . . }, etc. The second device or network device selects DesiredDRXSL2 and configures Parameter1=value3, Parameter2=value4 for the first device.

Exemplarily, DesiredDRXSL1={Parameter1valueRange1, Parameter2valueRange2 . . . }, DesiredDRXSL2={Parameter1valueRange3, Parameter2valueRange4 . . . }, etc. The second device or network device selects DesiredDRXSL1 to configure Parameter1=valueRange1, Parameter2=valueRange2 for the first device.

In some embodiments, the assistance information includes the at least one sidelink DRX parameter indicated by the first device, including: the assistance information includes any one of the following data for each sidelink DRX parameter in the at least one sidelink DRX parameter indicated by the first device:

(1) a maximum value of each sidelink DRX parameter.

In some embodiments, the assistance information includes a maximum value of the at least one sidelink DRX parameter. For each sidelink DRX parameter, the second device or network device shall not configure a value that exceeds the maximum value of the sidelink DRX parameter.

(2) a minimum value of each sidelink DRX parameter.

In some embodiments, the assistance information includes a minimum value of the at least one sidelink DRX parameter. For each sidelink DRX parameter, the second device or network device shall not configure a value less than the minimum value of the sidelink DRX parameter.

(3) maximum and minimum values of each sidelink DRX parameter.

In some embodiments, the assistance information includes maximum and minimum values of the at least one sidelink DRX parameter. For each sidelink DRX parameter, the second device or network device is required to configure a value between the minimum and maximum values of the sidelink DRX parameter.

(4) a preset value and a float coefficient of each sidelink DRX parameter.

In some embodiments, the assistance information includes a preset value and a float coefficient of the at least one sidelink DRX parameter. Exemplarily, a sidelink DRX parameter has a preset value of x and a float coefficient of 0.1, and the second device or the network device is required to configure a value of [0.9x, 1.1x] of the sidelink DRX parameter.

(5) a value set of each sidelink DRX parameter, the value set including at least one value.

In some embodiments, the assistance information includes a value set of the at least one sidelink DRX parameter. Exemplarily, the value set of a sidelink DRX parameter is {x1,x2,x3}, and the second device or the network device is required to configure a value in the value set.

In the embodiments, the sidelink DRX parameter includes at least one of the following parameters: sl-drx-LongCycle, sl-drx-StartOffset, sl-drx-onDurationTimer, sl-drx-SlotOffset, sl-drx-InactivityTimer, sl-drx-RetransmissionTimer, sl-drx-HARQ-RTT-Timer.

In some embodiments, the first information further includes a first parameter of a first counter, the first parameter being configured to indicate a maximum number of times for the first device to reject the sidelink DRX configuration. In the embodiments, the first device sends the first information to the second device, the first information including the assistance information and the first parameter.

In some embodiments, the first device may further send the assistance information and the first parameter to the second device separately.

It should be noted that the first counter may be understood as a sidelink counter, and the first counter may be arranged in both the first device and the second device in sidelink communication. The first counter is configured to record the number of times that the first device rejects the sidelink DRX configuration of the second device or the network device.

In some embodiments, the first device sends the first information to the second device, the first information including the first parameter of the first counter, and the first device may set an initial value of the first counter to be 0.

In some embodiments, the second device sends the second information to the first device, and the second device may set an initial value of the first counter to be 0.

In some embodiments, the first parameter is pre-configured, or configured by network, or instructed by an upper layer, or determined by the first device, for which the embodiments of the present disclosure are not specifically limited.

In the above embodiments, the first device and the second device are each arranged with the first counter, which is configured to record the number of times that the first device rejects the sidelink DRX configuration, and also to control the number of failures of the sidelink DRX configuration, as described in the later embodiments.

In some embodiments, the first information further includes a second parameter of the first timer, the second parameter being configured to indicate a maximum duration for the first device to receive the sidelink DRX configuration. In the embodiments, the first device sends the first information to the second device, the first information including the assistance information and the second parameter.

In some embodiments, the first device may further send the assistance information and the second parameter to the second device separately.

It is to be noted that the first timer may be understood as a sidelink timer, and the first timer may be arranged in both the first device and the second device in sidelink communication, and the first timer is configured to record the duration of the sidelink DRX configuration.

In some embodiments, the first device sends the first information to the second device for the first time, the first information including the second parameter of the first timer, and the first device may turn on the first timer.

In some embodiments, the first device sends a first instruction information to the second device for the first time, and the first device may turn on the first timer. The first instruction information is configured to indicate that the first device rejects the sidelink DRX configuration.

In some embodiments, the second device receives the first information sent by the first device for the first time, the first information including the second parameter of the first timer, and the second device may turn on the first timer.

In some embodiments, the second device receives the first instruction information from the first device for the first time, and the second device may turn on the first timer. The first instruction information is configured to indicate that the first device rejects the sidelink DRX configuration.

In some embodiments, the second parameter is pre-configured, or configured by network, or instructed by an upper layer, or determined by the first device.

In the above embodiments, the first device and the second device turn on the first timer for controlling the duration of the sidelink DRX configuration in addition to recording the duration of the sidelink DRX configuration, as can be seen in later embodiments.

The embodiments of the present disclosure illustrate a resource configuration method, where the first device sends a first information to the second device, the first information being configured for the second device or the network device to configure a sidelink DRX parameter for the first device; the first information includes an assistance information, the assistance information including at least one sidelink DRX parameter indicated by the first device. The above method may assist the second device or the network device in configuring accurate sidelink DRX parameters for the first device, for improving the success rate of sidelink DRX configuration, thereby improving the quality of sidelink communication.

It is to be noted that in the following embodiments, the first network device is a network device to which the first device belongs, the second network device is a network device to which the second device belongs, and the first network device and the second network device may be the same or different network devices.

Embodiment 2

Figure 7:
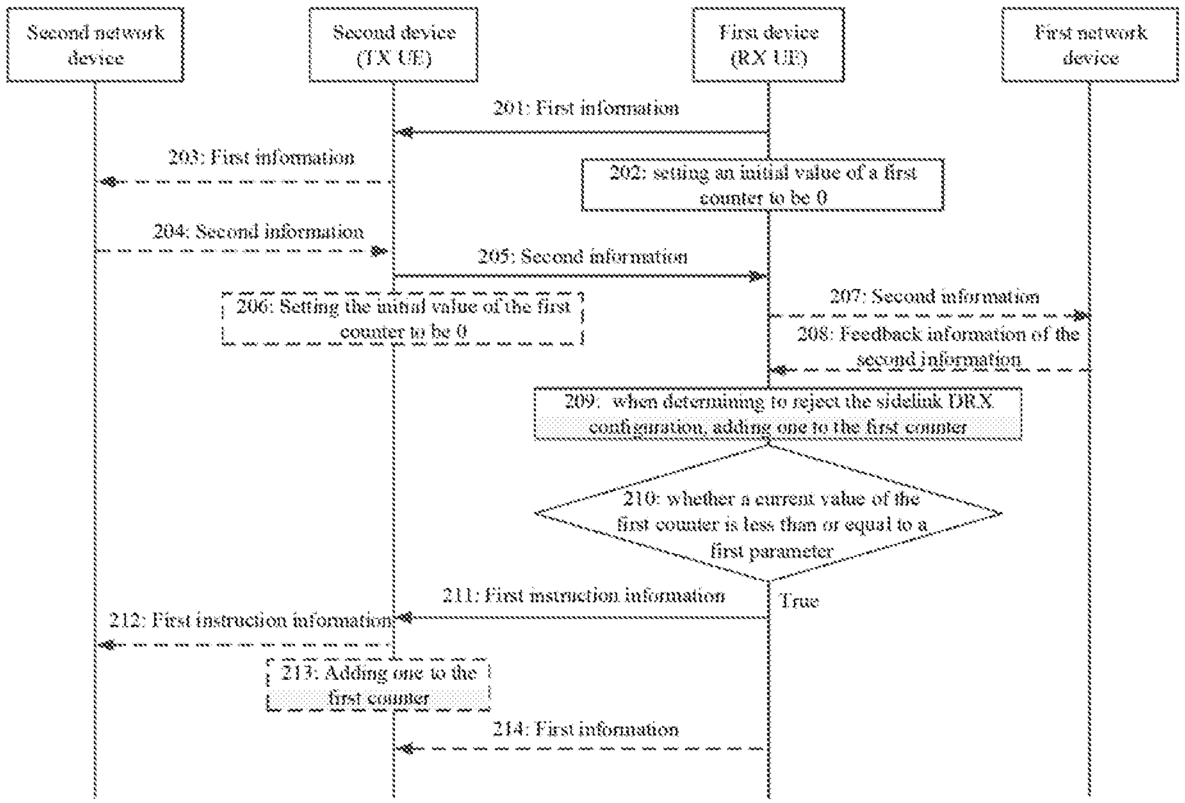
FIG. 7 is a flowchart of a resource allocation method according to other embodiments of the present disclosure.

FIG. 7 is a flowchart of a resource allocation method according to other embodiments of the present disclosure. As shown in FIG. 7, the resource allocation method provided by the present embodiment includes the following steps.

Step 201: sending, by a first device, a first information to a second device.

In some embodiments, the first information includes an assistance information and a first parameter of a first counter.

In some embodiments, the first device may send the assistance information and the first parameter of the first counter to the second device separately. In some embodiments, when the first device is in a connected state, the first device may further send the first parameter of the first counter to a first network device.

The assistance information includes at least one sidelink discontinuous reception (sidelink DRX) parameter indicated by the first device. The first parameter, i.e., a maximum value of the first counter, is configured to indicate a maximum number of times that the first device rejects the sidelink DRX configuration. Specifics regarding the assistance information, the first counter, and the first parameter may be found in the embodiments above and will not be repeated herein.

Step 202: setting, by the first device, an initial value of the first counter to be 0.

Step 203: sending, by the second device, the first information to the second network device. (Optional)

Step 204: sending, by the second network device, a second information to the second device. (Optional)

In some embodiments, when the second device is in a connected state, the second device, after receiving the first information, may report the received first information to a second network device, and the second network device may configure the sidelink DRX parameter for the first device according to the first information.

Step 205: sending, by the second device, the second information to the first device.

In some embodiments, when the second device is in a connected state, the second device may receive the second information from the second network device, the second information including the sidelink DRX parameter configured by the second network device for the first device.

In some embodiments, the second device configures the sidelink DRX parameter for the first device according to the first information and sends the second information to the first device, the second information including the sidelink DRX parameter configured by the second device for the first device.

Step 206: setting, by the second device, the initial value of the first counter to be 0. (Optional)

Step 207: sending, by the first device, the second information to the first network device. (Optional)

Step 208: sending, by the first network device, a feedback information of the second information to the first device. (Optional)

In some embodiments, when the first device is in a connected state, the first device reports the second information to the first network device. The first network device sends the feedback information of the second information to the first device, the feedback information including an instruction of receiving or rejecting the sidelink DRX configuration.

Step 209: in response to the first device determining to reject the sidelink DRX configuration, adding, by the first device, one to the first counter.

In some embodiments, the first device determines to receive or reject the sidelink DRX configuration according to its own implementation.

In some embodiments, the first device determines to receive or reject the sidelink DRX configuration according to the feedback information of the second information from the first network device.

Step 210: determining, by the first device, whether a current value of the first counter is less than or equal to a first parameter.

When the current value of the first counter is less than or equal to the first parameter, step 211 is performed. When the current value of the first counter is greater than the first parameter, the first device may release the sidelink (not shown) with the second device.

Step 211: sending, by the first device, a first instruction information to the second device.

In the embodiments, the first instruction information is configured to indicate that the first device rejects the sidelink DRX configuration. The first instruction information may also be referred to as a rejection instruction.

In some embodiments, the first instruction information includes at least one of the following:

- the first parameter of the first counter, the first parameter for indicating a maximum number of times the first device rejects the sidelink DRX configuration;
- the current value of the first counter; and
- a difference between the first parameter and the current value of the first counter.

In some embodiments, the first instruction information further includes a reason for the first device to reject the sidelink DRX parameter configuration.

In some embodiments, the reason for the first device to reject the sidelink DRX parameter configuration includes that: the first device does not receive the sidelink DRX configuration (i.e., the second information does not include the sidelink DRX configuration), or the sidelink DRX configuration in the second information does not correspond to the desired sidelink DRX configuration indicated by the first information.

In some embodiments, when the first device determines to reject the sidelink DRX configuration, it may directly send the first instruction information to the second device.

Step 212: sending, by the second device, the first instruction information to the second network device. (Optional)

In some embodiments, when the second device is in a connected state, the second device sends the first instruction information to the second network device, such that the second network device is informed of that the first device rejects the sidelink DRX parameter configuration.

Step 213: adding, by the second device, one to the first counter. (Optional)

Step 214: sending, by the first device, the first information to the second device again. (Optional)

In some embodiments, when the current value of the first counter is less than the first parameter, the first device sends the first information to the second device again. The fact that the current value of the first counter is less than its maximum value indicates that the number of failures of the sidelink DRX configuration of the first device has not yet reached the maximum number of failures, and thus the first device may resend the first information to assist the second device or the second network device in configuring the sidelink DRX parameter for the first device.

It should be noted that the order of execution of the various steps in the embodiments is only for example and should not constitute any limitation of the present disclosure.

The embodiments of the present disclosure illustrate a resource allocation method, where the first device sends a first information to the second device, and the first device receives a second information from the second device, the second information including a sidelink DRX parameter configured by the second device or the second network device for the first device; and when the first device determines to reject the sidelink DRX configuration and a current value of the first counter is less than or equal to a first parameter, the first device sends a first instruction information to the second device, the first instruction information for instructing that the first device rejects the sidelink DRX configuration. In the embodiments, the first device controls the number of times the sidelink DRX configuration is rejected by the first counter, such that when a resource allocator and a resource allocation receiver (e.g., the second device and the first device or, alternatively, the second network device and the first device) have not been able to reach an agreement on the sidelink DRX configuration, a power saving need of the first device can be met by setting the counter.

Embodiment 3

Figure 8:
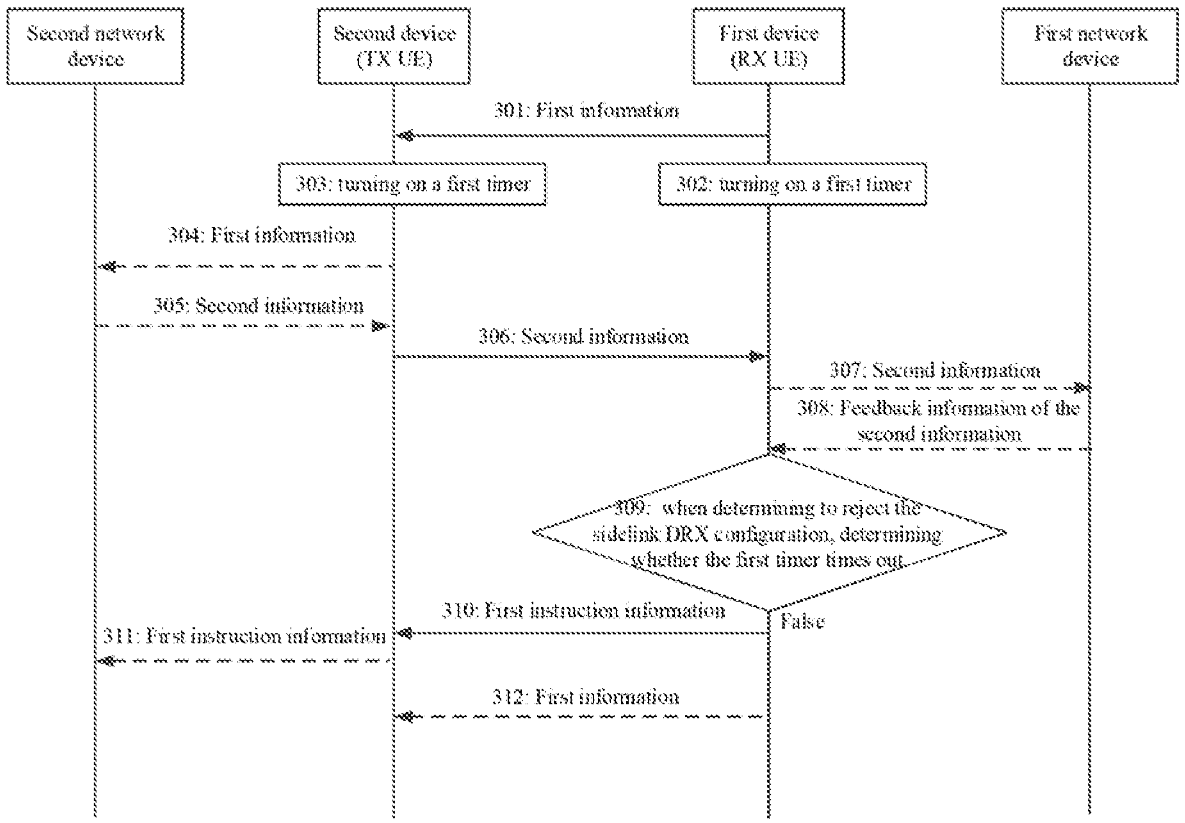
FIG. 8 is a flowchart of a resource allocation method according to further other embodiments of the present disclosure.

FIG. 8 is a flowchart of a resource allocation method according to further other embodiments of the present disclosure. As shown in FIG. 8, the resource configuration method provided by the present embodiment includes the following steps.

Step 301: sending, by a first device, a first information to a second device.

In some embodiments, the first information includes an assistance information and a second parameter of a first timer.

In some embodiments, the first device may send the assistance information and the second parameter of the first timer to the second device separately. In some embodiments, when the first device is in a connected state, the first device may further send the second parameter of the first timer to a first network device.

The assistance information includes at least one sidelink discontinuous reception (sidelink DRX) parameter indicated by the first device. The second parameter, i.e., a maximum duration of the first timer, is configured to record a duration of the sidelink DRX configuration. Specifics regarding the assistance information, the first timer, and the second parameter may be found in the embodiments above and will not be repeated herein.

Step 302: turning on, by the first device, the first timer.

Step 303: turning on, by the second device, the first timer.

Step 304: sending, by the second device, the first information to a second network device. (Optional)

Step 305: sending, by the second network device, a second information to the second device. (Optional)

In some embodiments, when the second device is in a connected state, the second device, after receiving the first information, may report the received first information to the second network device, and the second network device may configure the sidelink DRX parameter for the first device according to the first information.

Step 306: sending, by the second device, the second information to the first device.

In some embodiments, when the second device is in a connected state, the second device may receive the second information from the second network device, the second information including the sidelink DRX parameter configured by the second network device for the first device.

In some embodiments, the second device configures the sidelink DRX parameter for the first device according to the first information and sends the second information to the first device, the second information including the sidelink DRX parameter configured by the second device for the first device.

Step 307: sending, by the first device, the second information to the first network device. (Optional)

Step 308: sending, by the first network device, a feedback information of the second information to the first device. (Optional)

In some embodiments, when the first device is in a connected state, the first device reports the second information to the first network device. The first network device sends the feedback information of the second information to the first device, the feedback information including an instruction of receiving or rejecting the sidelink DRX configuration.

Step 309: in response to the first device determining to reject the sidelink DRX configuration, determining, by the first device, whether the first timer times out.

In some embodiments, the first device determines to receive or reject the sidelink DRX configuration according to its own implementation.

In some embodiments, the first device determines to receive or reject the sidelink DRX configuration according to the feedback information of the second information from the first network device.

In the embodiments, when the first timer has not timed out, step 310 is performed. When the first timer times out, the first device may release the sidelink (not shown) with the second device.

Step 310: sending, by the first device, a first instruction information to the second device.

In the embodiments, the first instruction information is configured to indicate that the first device rejects the sidelink DRX configuration.

In some embodiments, the first instruction information includes at least one of the following:

the second parameter of the first timer, the second parameter for indicating a maximum duration for which the first device receives the sidelink DRX configuration;

a current value of the first timer; and a duration remaining for the first timer from timeout.

In some embodiments, the first instruction information further includes a reason for the first device to reject the sidelink DRX parameter configuration.

In some embodiments, when the first device determines to reject the sidelink DRX configuration, it may directly send the first instruction information to the second device.

Step 311: sending, by the second device, the first instruction information to the second network device. (Optional)

In some embodiments, when the second device is in a connected state, the second device sends the first instruction information to the second network device, such that the second network device is informed of that the first device rejects the sidelink DRX parameter configuration.

Step 312: sending, by the first device, the first information to the second device again. (Optional)

In some embodiments, when the first timer has not timed out, the first device sends the first information to the second device again. The fact that the first timer has not timed out indicates that the duration for the first device to receive the sidelink DRX configuration has not reached the maximum duration, and thus the first device may resend the first information to assist the second device or the second network device in configuring the sidelink DRX parameter for the first device.

It should be noted that the order of execution of the various steps in the embodiments is only for example and should not constitute any limitation of the present disclosure.

The embodiments of the present disclosure illustrate a resource allocation method, where the first device sends a first information to the second device, and the first device receives a second information from the second device, the second information including a sidelink DRX parameter configured by the second device or the second network device for the first device; and when the first device determines to reject the sidelink DRX configuration and a first timer is not timed out, the first device sends a first instruction information to the second device, the first instruction information for instructing that the first device rejects the sidelink DRX configuration. In the embodiments, the first device controls whether or not to send the instruction of rejecting the sidelink DRX configuration through the first timer, such that when a resource allocator and a resource allocation receiver (e.g., the second device and the first device or, alternatively, the second network device and the first device) have not been able to reach an agreement on the sidelink DRX configuration, a power saving need of the first device can be met by setting the timer.

Embodiment 4

Figure 9:
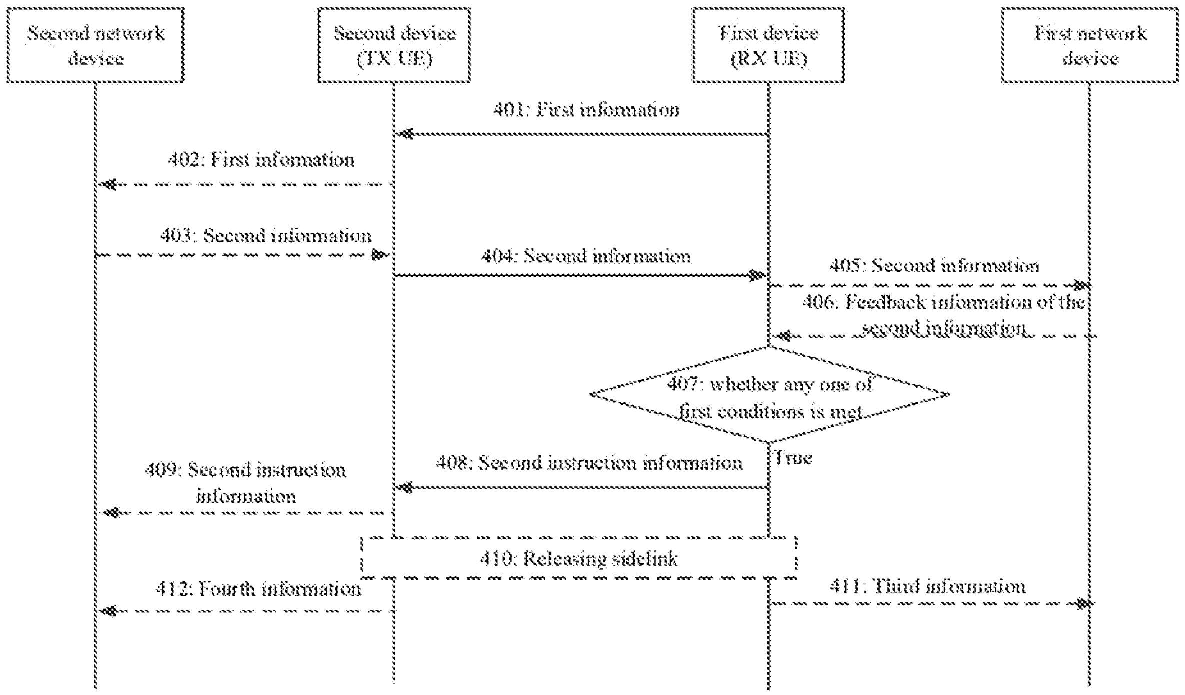
FIG. 9 is a flowchart of a resource allocation method according to still other embodiments of the present disclosure.

FIG. 9 is a flowchart of a resource allocation method according to still other embodiments of the present disclosure. As shown in FIG. 9, the resource configuration method provided by the present embodiment includes the following steps.

Step 401: sending, by a first device, a first information to a second device.

In some embodiments, the first information includes an assistance information and a first parameter of a first counter.

In some embodiments, the first device may send the assistance information and the first parameter of the first counter to the second device separately. In some embodiments, when the first device is in a connected state, the first device may further send the first parameter of the first counter to a first network device.

In some embodiments, the first information includes an assistance information and a second parameter of a first timer.

In some embodiments, the first device may send the assistance information and the second parameter of the first timer to the second device separately. In some embodiments, when the first device is in a connected state, the first device may further send the second parameter of the first timer to a first network device.

The assistance information includes at least one sidelink discontinuous reception (sidelink DRX) parameter indicated by the first device. The first parameter, i.e., a maximum value of the first counter, is configured to indicate a maximum number of times that the first device rejects the sidelink DRX configuration. The second parameter, i.e., a maximum duration of the first timer, is configured to record a duration of the sidelink DRX configuration. Specifics regarding the assistance information, the first counter, the first parameter, the first timer, and the second parameter may be found in the embodiments above and will not be repeated herein.

Step 402: sending, by the second device, the first information to a second network device. (Optional)

Step 403: sending, by the second network device, a second information to the second device. (Optional)

In some embodiments, when the second device is in a connected state, the second device, after receiving the first information, may report the received first information to the second network device, and the second network device may configure the sidelink DRX parameter for the first device according to the first information.

Step 404: sending, by the second device, the second information to the first device.

In some embodiments, when the second device is in a connected state, the second device may receive the second information from the second network device, the second information including the sidelink DRX parameter configured by the second network device for the first device.

In some embodiments, the second device configures the sidelink DRX parameter for the first device according to the first information and sends the second information to the first device, the second information including the sidelink DRX parameter configured by the second device for the first device.

Step 405: sending, by the first device, the second information to the first network device. (Optional)

Step 406: sending, by the first network device, a feedback information of the second information to the first device. (Optional)

In some embodiments, when the first device is in a connected state, the first device reports the second information to the first network device. The first network device sends the feedback information of the second information to the first device, the feedback information including an instruction of receiving or rejecting the sidelink DRX configuration.

Step 407: determining, by the first device, whether any one of first conditions is met:

When any one of the first conditions is met, step 408 is performed.

In some embodiments, the first conditions include that: a current value of the first counter is greater than a first parameter of the first counter; or the first timer times out; or the first device determines according to its own implementation.

Step 408: sending, by the first device, a second instruction information to the second device.

In the embodiments, the second instruction information is configured to instruct the second device to release the sidelink with the first device. The second instruction information may also be referred to as a release instruction.

In some embodiments, the second instruction information is carried in a PC5 secure (PC5-S) signaling or a PC5 radio resource control (RRC) signaling.

Step 409: sending, by the second device, the second instruction information to the second network device. (Optional)

Step 410: releasing a sidelink between the first device and the second device. (Optional)

In some embodiments, when the first device determines that the current value of the first counter is greater than the first parameter, the first device sends the second instruction information to the second device, and/or, releases the sidelink with the second device.

In some embodiments, when the first device determines that the first timer has timed out, the first device sends the second instruction information to the second device, and/or, releases the sidelink with the second device.

In some embodiments, when the first device determines to release the sidelink according to its own implementation, the first device sends the second instruction information to the second device, and/or, releases the sidelink with the second device.

In some embodiments, the sidelink release may be a PC5-S link release, or, a PC5 RRC link release.

As can be seen from the above embodiments, the first device may only send the second instruction information to the second device, or, directly release the sidelink with the second device without sending the second instruction information, or, release the sidelink with the second device after sending the second instruction information. Power saving is thus achieved by releasing the sidelink.

In some embodiments, the second device receives the second instruction information from the first device, and/or, releases the sidelink with the first device.

In some embodiments, when the second device determines that the current value of the first counter is greater than the first parameter, and/or, the second device receives the second instruction information from the first device, the second device releases the sidelink with the first device.

In some embodiments, when the second device determines that the first timer times out, and/or, the second device receives the second instruction information from the first device, the second device releases the sidelink with the first device.

Step 411: sending, by the first device, a third information to the first network device. (Optional)

In the embodiments, the third information is configured to indicate that the first device has released the sidelink with the second device.

Step 412: sending, by the second device, a fourth information to the second network device. (Optional)

In the embodiments, the fourth information is configured to indicate that the second device has released the sidelink with the first device.

It should be noted that the order of execution of the various steps in the embodiments is only for example and should not constitute any limitation of the present disclosure.

The embodiments of the present disclosure illustrate a resource allocation method, where the first device sends a first information to the second device, and the first device receives a second information from the second device, the second information including a sidelink DRX parameter configured by the second device or the second network device for the first device. When a current value of the first counter is greater than a maximum value, or, the first timer times out, or, the first device determines that the sidelink is required to be released according to its own implementation, the first device sends a second instruction information to the second device, the second instruction information for instructing that the second device releases the sidelink with the first device. The first device may send only the second instruction information, or may directly release the sidelink with the second device without sending the second instruction information, or may release the sidelink with the second device after sending the second instruction information. The above embodiments have the following beneficial effect: when a resource allocator and a resource allocation receiver (e.g., the second device and the first device or, alternatively, the second network device and the first device) have not been able to reach an agreement on the sidelink DRX configuration, a power saving need of the first device can be met by setting the timer.

Based on each of the above embodiments, in some embodiments, when the first device determines to reject the sidelink DRX parameter configuration, the first device may send the first instruction information and the second instruction information separately, or, the first device may send the first instruction information and the second instruction information at the same time.

Embodiment 5

Figure 10:
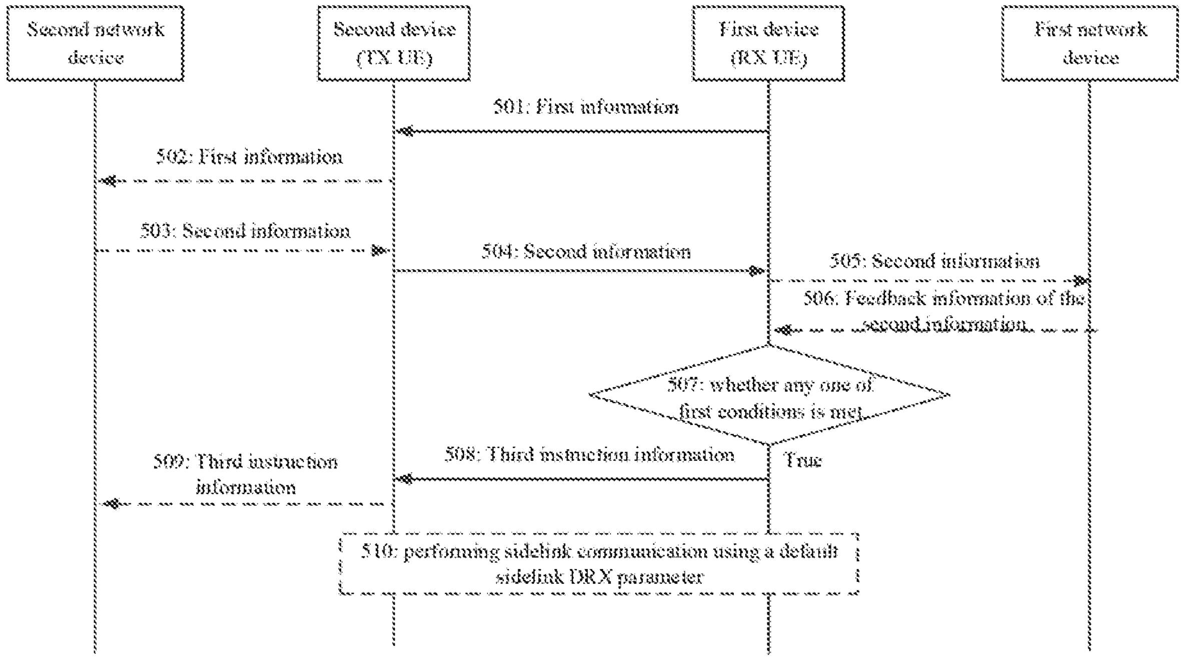
FIG. 10 is a flowchart of a resource allocation method according to still other embodiments of the present disclosure.

FIG. 10 is a flowchart of a resource allocation method according to still other embodiments of the present disclosure. As shown in FIG. 10, the resource allocation method provided by the present embodiment includes the following steps.

Step 501: sending, by a first device, a first information to a second device.

Step 502: sending, by the second device, the first information to a second network device. (Optional)

Step 503: sending, by the second network device, a second information to the second device. (Optional)

Step 504: sending, by the second device, the second information to the first device.

Step 505: sending, by the first device, the second information to a first network device. (Optional)

Step 506: sending, by the first network device, a feedback information of the second information to the first device. (Optional)

Steps 501 to step 506 of the present embodiments are similar to steps 401 to step 406 of the above embodiments, which may be seen in the above embodiments, and will not be repeated herein.

Step 507: determining, by the first device, whether any one of first conditions is met.

When any one of the first conditions is met, step 508 is performed.

In some embodiments, the first conditions include that: a current value of the first counter is greater than a first parameter of the first counter; or the first timer times out; or the first device determines according to its own implementation.

Step 508: sending, by the first device, a third instruction information to the second device.

In the embodiments, the third instruction information is configured to indicate that the first device falls back to a default sidelink DRX configuration. The third instruction information may also be referred to as a fallback indication.

In some embodiments, the default sidelink DRX parameter includes any of the following:

a sidelink DRX parameter for multicast; a sidelink DRX parameter for unicast; a sidelink DRX parameter for broadcast; and a sidelink DRX parameter same as a direct connection establishment request (DCR) message.

In some embodiments, the third instruction information is carried in a medium access control control element (MAC CE), a PC5 RRC signaling, or a physical layer signaling.

Step 509: sending, by the second device, the third instruction information to the second network device. (Optional)

Step 510: performing, by the first device and the second device, a sidelink communication using the default sidelink DRX parameter.

In some embodiments, when the first device determines that the current value of the first counter is greater than the first parameter, the first device sends the third instruction information to the second device, and/or, sets the sidelink DRX parameter of the first device to the default sidelink DRX parameter (i.e., the first device adopts the default sidelink DRX parameter for the sidelink communication with the second device).

In some embodiments, when the first device determines that the first timer has timed out, the first device sends the third instruction information to the second device, and/or, sets the sidelink DRX parameter of the first device to the default sidelink DRX parameter.

In some embodiments, when the first device determines to fall back to the default sidelink DRX parameter according to its own implementation, the first device sends the third instruction information to the second device, and/or, sets the sidelink DRX parameter of the first device to the default sidelink DRX parameter.

As can be seen from the above embodiments, instead of releasing the sidelink with the second device, the first device may fall back to the default sidelink DRX parameter configuration, and the first device sends the third instruction information to the second device instructing the second device to communicate with the first device in sidelink using the default sidelink DRX parameter. There is no need for the second device or the second network device to configure the sidelink DRX parameter to the first device again.

In some embodiments, the second device receives the third instruction information from the first device, and/or, performs the sidelink communication with the first device using the default sidelink DRX parameter.

In some embodiments, when the second device determines that the current value of the first counter is greater than the first parameter, and/or, the second device receives the third instruction information from the first device, the second device performs the sidelink communication with the first device using the default sidelink DRX parameter.

In some embodiments, when the second device determines that the first timer times out, and/or, the second device receives the third instruction information from the first device, the second device performs the sidelink communication with the first device using the default sidelink DRX parameter.

It should be noted that the order of execution of the various steps in the embodiments is only for example and should not constitute any limitation of the present disclosure.

The embodiments of the present disclosure illustrate a resource allocation method, where the first device sends a first information to the second device, and the first device receives a second information from the second device, the second information including a sidelink DRX parameter configured by the second device or the second network device for the first device. When a current value of the first counter is greater than a maximum value, or, the first timer times out, or, the first device determines to fall back to the default sidelink DRX parameter according to its own implementation, the first device sends a third instruction information to the second device, the third instruction information for indicating that the first device falls back to the default sidelink DRX configuration, and the first device and the second device perform sidelink communication using the default sidelink DRX configuration. The above embodiments have the following beneficial effect: when a resource allocator and a resource allocation receiver (e.g., the second device and the first device or, alternatively, the second network device and the first device) have not been able to reach an agreement on the sidelink DRX configuration, a power saving need of the first device can be met by setting the timer.

Embodiment 6

Figure 11:
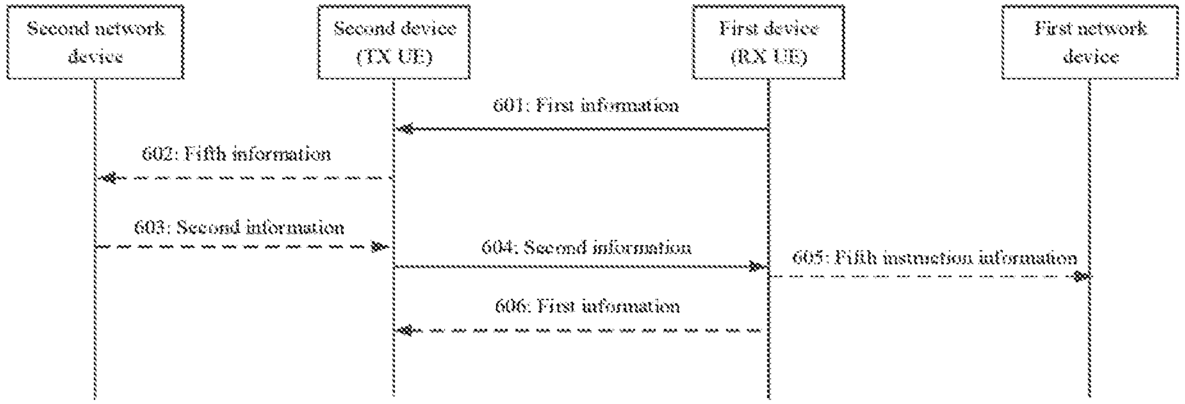
FIG. 11 is a flowchart of a resource allocation method according to still other embodiments of the present disclosure.

FIG. 11 is a flowchart of a resource allocation method according to still other embodiments of the present disclosure. As shown in FIG. 11, the resource allocation method provided by the present embodiment includes the following steps.

Step 601: sending, by a first device, a first information to a second device.

In the embodiments, the first information does not include an assistance information.

Step 602: sending, by the second device, a fifth information to a second network device. (Optional)

In the embodiments, the fifth information is configured to indicate that the second device does not receive the assistance information.

In some embodiments, when the first information does not include the assistance information, the second device sends the fifth information to the second network device.

In some embodiments, when the first information does not include the assistance information, the second device waits for a second duration after receiving the first information to send the fifth information to the second network device. The purpose of the second device waiting for the second duration is to extend a time for receiving the assistance information.

In some embodiments, when the first information does not include the assistance information, the second device directly sends the fifth information to the second network device after receiving the first information.

In some embodiments, the second duration is configured by network, or configured by the first device, or instructed by an upper layer, or a duration until the second device receives the assistance information.

In some embodiments, the second device sends the second duration to the first device, and the first device is required to send the assistance information to the second device within the second duration (when the first device requires the sidelink DRX configuration).

Step 603: sending, by the second network device, a second information to the second device. (Optional)

In some embodiments, the second network device sends the second information to the second device after receiving the fifth information, the second information including a sidelink DRX parameter configured by the second network device for the first device, i.e., the second network device may configure the sidelink DRX parameter for the first device when not receiving the assistance information.

In some embodiments, the second network device sends the second information to the second device after receiving the fifth information, the second information not including a sidelink DRX parameter configured by the second network device for the first device.

Step 604: sending, by the second device, the second information to the first device.

In some embodiments, the second device receives the second information from the second network device and sends the second information to the first device. The second information includes or does not include the sidelink DRX parameter configured by the second network device for the first device.

In some embodiments, the second information includes or does not include sidelink DRX parameter configured by the second device for the first device.

In some embodiments, when the second information does not include the sidelink DRX parameter configured by the second device or the second network device for the first device, the second device adds one to a current value of a first counter.

In some embodiments, when the first information does not include the assistance information, the second device waits for a second duration after receiving the first information to send the second information to the first device.

In some embodiments, when the first information does not include the assistance information, the second device directly sends the second information to the first device after receiving the first information.

In some embodiments, when the first information does not include the assistance information, the second device sends the fifth information to the second network device, and the second device sends the second information to the first device.

Step 605: sending, by the first device, a fifth instruction information to the first network device. (Optional)

In the embodiments, the fifth instruction information is configured to indicate that the first device has not received the sidelink DRX configuration.

In some embodiments, when the second information does not include the sidelink DRX configuration, the first device sends the fifth instruction information to the first network device.

In some embodiments, when the second information does not include the sidelink DRX configuration, the first device waits for a first duration after receiving the second information to send the fifth instruction information to the first network device. The purpose of the first device waiting for the first duration is to extend a time for receiving the sidelink DRX configuration.

In some embodiments, when the second information does not include the sidelink DRX configuration, the first device sends the fifth instruction information directly to the first network device after receiving the second information.

In some embodiments, the first duration is configured by network, or configured by the second device, or instructed by an upper layer, or a duration until the first device receives the sidelink DRX configuration.

In some embodiments, the first device sends the first duration to the second device. The second device is required to configure the sidelink DRX parameter for the first device within the first duration.

Step 606: sending, by the first device, the first information to the second device again. (Optional)

In some embodiments, when the second information does not include the sidelink DRX configuration, the first device sends the first information to the second device again.

In some embodiments, when the second information does not include the sidelink DRX configuration, the first device waits for a first duration after receiving the second information to send the first information to the second device again.

In some embodiments, when the second information does not include the sidelink DRX configuration, the first device sends the first information directly to the second device after receiving the second information.

In some embodiments, when the second information does not include the sidelink DRX configuration, the first device may perform at least one of the following steps.

the first device sends the first information to the second device again;

the first device sends the fifth instruction information to the first network device; and the first device sends a feedback information of the second information to the second device.

The feedback information may carry the first instruction information (i.e., a rejection instruction) as described above.

In some embodiments, when the second information does not include the sidelink DRX configuration, the first device waits for a first duration after receiving the second information to send the feedback information of the second information to the second device.

In some embodiments, when the second information does not include the sidelink DRX configuration, the first device sends the feedback information of the second information directly to the second device after receiving the second information.

In some embodiments, when the second information does not include the sidelink DRX configuration, the first device adds one to a current value of the first counter.

In some embodiments, when the second information does not include the sidelink DRX configuration, the first device turns on a first timer.

It should be noted that the order of execution of the various steps in the embodiments is only for example and should not constitute any limitation of the present disclosure.

The embodiments of the present disclosure illustrate a resource allocation method, where the second device may wait for a second duration when the second device does not receive an assistance information from the first device, and when the second device still does not receive the assistance information, the second device sends a second information to the first device, the second information including or not including the sidelink DRX configuration. When the second information includes the sidelink DRX configuration, the configuration is not based on the assistance information. When the second information does not include the sidelink DRX configuration, the first device may wait for a first duration, and when the first device still does not receive the sidelink DRX configuration, the first device sends a first information including the assistance information to the second device again, or, the first device sends a fifth instruction information to the first network device indicating that the first device has not received the sidelink DRX configuration. The above-described scheme may increase the flexibility of the sidelink device to receive information.

Based on each of the above embodiments, in some embodiments, the second device may send a first request to the first device, the first request being configured to trigger the first device to send the first information. That is, the first device may send the first information to the second device based on the triggering request of the second device.

In some embodiments, the first request may be a 1-bit indication, e.g., 1 indicates triggering the first device to send the first information, and 0 indicates not triggering the first device to send the first information.

In some embodiments, the first request carries information about data sent from the second device (i.e., information such as traffic pattern).

The resource allocation methods provided by the embodiments of the present disclosure are described in detail above, and sidelink devices provided by the embodiments of the present disclosure, including the first device and the second device, will be described below.

Figure 12:
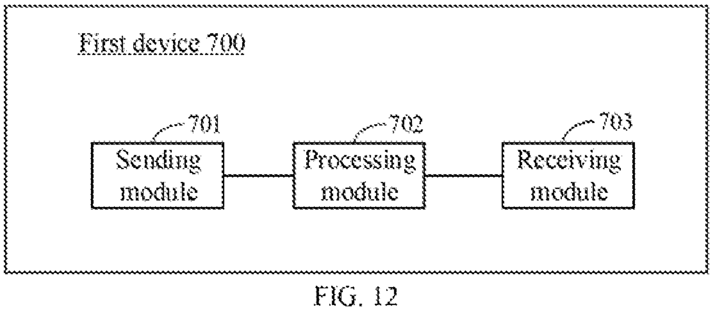
FIG. 12 is a structural schematic view of a first device according to some embodiments of the present disclosure.

FIG. 12 is a structural schematic view of a first device according to some embodiments of the present disclosure. As shown in FIG. 12, a first device 700 includes: a sending module 701, a processing module 702, and a receiving module 703.

The sending module 701 is configured to send a first information to a second device; where the first information includes an assistance information, the assistance information including at least one sidelink discontinuous reception (DRX) parameter indicated by the first device; the first information is configured for the second device or a network device to configure a sidelink DRX parameter for the first device.

In some embodiments, the assistance information includes at least one sidelink DRX parameter indicated by the first device, including:

- the assistance information includes a value range of the at least one sidelink DRX parameter indicated by the first device.

In some embodiments, the assistance information includes at least one sidelink DRX parameter indicated by the first device, including:

- the at least one sidelink DRX parameter includes multiple sidelink DRX parameter sets, and each sidelink DRX parameter set includes a value range or a value of each sidelink DRX parameter in the sidelink DRX parameter set.

In some embodiments, the assistance information includes at least one sidelink DRX parameter indicated by the first device, including:

- the assistance information includes any one of the following data for each of the at least one sidelink DRX parameter indicated by the first device:
- a maximum value of each sidelink DRX parameter; or
- a minimum value of each sidelink DRX parameter; or
- a maximum value and a minimum value of each sidelink DRX parameter; or
- a preset value and a float coefficient of each sidelink DRX parameter; or
- a value set for each sidelink DRX parameter, the value set including at least one value.

In some embodiments, the first information further includes a first parameter of a first counter, the first parameter being configured to indicate a maximum number of times the first device rejects the sidelink DRX configuration.

In some embodiments, the sending module 701 is further configured to:

- send a first parameter of a first counter to the second device, the first parameter being configured to indicate a maximum number of times the first device rejects the sidelink DRX configuration.

In some embodiments, the first parameter is pre-configured, or configured by network, or instructed by an upper layer, or determined by the first device.

In some embodiments, the processing module 702 is configured to:

- set an initial value of the first counter to be 0. The first counter is configured to record the number of times the first device rejects the sidelink DRX configuration.

In some embodiments, the first information further includes a second parameter of a first timer, the second parameter being configured to indicate a maximum duration for the first device to receive the sidelink DRX configuration.

In some embodiments, the sending module 701 is further configured to:

- send a second parameter of a first timer to the second device, the second parameter being configured to indicate a maximum duration for the first device to receive the sidelink DRX configuration.

In some embodiments, the second parameter is pre-configured, or configured by network, or instructed by an upper layer, or determined by the first device.

In some embodiments, the processing module 702 is further configured to turn on or restart the first timer.

In some embodiments, the receiving module 703 is configured to:

- receive a second information from the second device, the second information including a sidelink DRX parameter configured by the second device or a network device for the first device.

In some embodiments, the sending module 701 is configured to:

- send a first instruction information to the second device in response to determining to reject the sidelink DRX parameter configuration, the first instruction information being configured to indicate that the first device rejects the sidelink DRX parameter configuration.

In some embodiments, the first instruction information includes at least one of the following.

- a first parameter of a first counter, the first parameter for indicating a maximum number of times the first device rejects the sidelink DRX configuration;
- a current value of the first counter; and
- a difference between the first parameter and the current value of the first counter.

In some embodiments, the first instruction information includes at least one of the following.

- a second parameter of a first timer, the second parameter for indicating a maximum duration for the first device to receive the sidelink DRX configuration;
- a current value of the first timer; and
- a duration remaining for the first timer from timeout.

In some embodiments, the first instruction information further includes a reason for the first device to reject the sidelink DRX parameter configuration.

In some embodiments, the first instruction information is carried in a medium access control control element (MAC CE), a PC5 radio resource control (RRC) signaling, or a physical layer signaling.

In some embodiments, the sending module 701 is further configured to:

- send a first instruction information to the second device, in response to determining to reject the sidelink DRX parameter configuration and a current value of a first counter being less than or equal to a first parameter; or
- send a first instruction information to the second device, in response to determining to reject the sidelink DRX parameter configuration and a first timer has not timed out.

In some embodiments, the processing module 702 is further configured to add one to the current value of the first counter.

In some embodiments, the sending module 701 is further configured to send the first information to the second device again.

In some embodiments, the sending module 701 is further configured to send a second instruction information to the second device, and/or, the processing module 702 is further configured to release a sidelink with the second device; the second instruction information is configured to instruct the second device to release the sidelink with the first device.

In some embodiments, the sending module 701 is further configured to send the second instruction information to the second device, and/or, the processing module 702 is further configured to release the sidelink with the second device, in response to any one of first conditions being met.

The first conditions include that: a current value of the first counter is greater than a first parameter of the first counter; or the first timer times out; or the first device determines according to its own implementation.

In some embodiments, the second instruction information is carried in a PC5 secure signaling or a PC5 RRC signaling.

In some embodiments, the sending module 701 is further configured to:

send a third information to the network device, the third information being configured to indicate that the first device has released the sidelink with the second device.

In some embodiments, the sending module 701 is further configured to send a third instruction information to the second device, and/or, the processing module 702 is further configured to set the sidelink DRX parameter of the first device to a default sidelink DRX parameter; the third instruction information being configured to indicate that the first device falls back to the default sidelink DRX configuration.

In some embodiments, the sending module 701 is further configured to send the third instruction information to the second device, and/or, the processing module 702 is further configured to set the sidelink DRX parameter of the first device to the default sidelink DRX parameter, in response to any one of first conditions being met.

The first conditions include that: a current value of the first counter is greater than a first parameter of the first counter; or the first timer times out; or the first device determines according to its own implementation.

In some embodiments, the default sidelink DRX parameter includes any one of the following:

a sidelink DRX parameter for multicast;

a sidelink DRX parameter for unicast;

a sidelink DRX parameter for broadcast; and a sidelink DRX parameter same as a direct connection establishment request (DCR) message.

In some embodiments, the third instruction information is carried in a MAC CE, a PC5 RRC signaling, or a physical layer signaling.

In some embodiments, in response to the second information not including the sidelink DRX configuration, the sending module 701 is further configured to perform at least one of the following steps:

sending the first information to the second device again; or sending a fifth instruction information to the network device, the fifth instruction information being configured to indicate that the first device has not received the sidelink DRX configuration; or sending a feedback information of the second information to the second device.

In some embodiments, the sending module 701 is further configured to:

after receiving the second information, wait for a first duration to send the first information to the second device again; or after receiving the second information, directly send the first information to the second device.

In some embodiments, the sending module 701 is further configured to:

after receiving the second information, wait for a first duration to send the fifth instruction information to the network device; or after receiving the second information, directly send the fifth instruction information to the network device.

In some embodiments, the sending module 701 is further configured to:

after receiving the second information, wait for a first duration to send the feedback information of the second information to the second device; or after receiving the second information, directly send the feedback information of the second information to the second device.

In some embodiments, the first duration is configured by network, or configured by the second device, or instructed by an upper layer, or a duration until the first device receives the sidelink DRX configuration.

The first device provided in the above embodiments may be configured to perform the method performed by the first device in any of the method embodiments described above, which are similar in principle of realization and technical effect, which will not be repeated herein.

Figure 13:
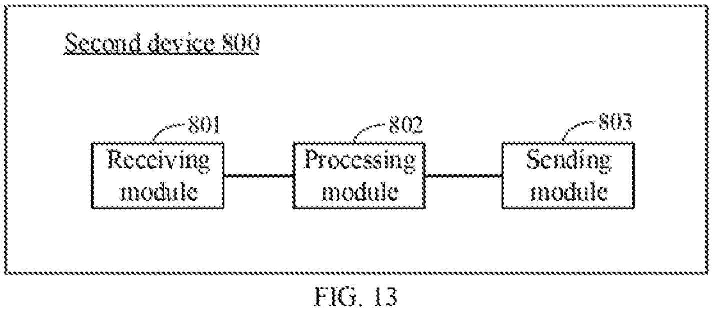
FIG. 13 is a structural schematic view of a second device according to some embodiments of the present disclosure.

FIG. 13 is a structural schematic view of a second device according to some embodiments of the present disclosure. As shown in FIG. 13, a second device 800 includes: a receiving module 801, a processing module 802, and a sending module 803.

The receiving module 801 is configured to receive a first information from a first device; where the first information includes an assistance information, the assistance information including at least one sidelink discontinuous reception (DRX) parameter indicated by the first device; the first information is configured for the second device or a network device to configure a sidelink DRX parameter for the first device.

In some embodiments, the assistance information includes at least one sidelink DRX parameter indicated by the first device, including:

the assistance information includes a value range of the at least one sidelink DRX parameter indicated by the first device.

In some embodiments, the assistance information includes at least one sidelink DRX parameter indicated by the first device, including:

the at least one sidelink DRX parameter includes multiple sidelink DRX parameter sets, and each sidelink DRX parameter set includes a value range or a value of each sidelink DRX parameter in the sidelink DRX parameter set.

In some embodiments, the assistance information includes at least one sidelink DRX parameter indicated by the first device, including:

the assistance information includes any one of the following data for each of the at least one sidelink DRX parameter indicated by the first device:

a maximum value of each sidelink DRX parameter; or a minimum value of each sidelink DRX parameter; or a maximum value and a minimum value of each sidelink DRX parameter; or a preset value and a float coefficient of each sidelink DRX parameter; or a value set for each sidelink DRX parameter, the value set including at least one value.

In some embodiments, the first information further includes a first parameter of a first counter, the first parameter being configured to indicate a maximum number of times the first device rejects the sidelink DRX configuration.

In some embodiments, the receiving module 801 is further configured to:

receive a first parameter of a first counter from the first device, the first parameter being configured to indicate a maximum number of times the first device rejects the sidelink DRX configuration.

In some embodiments, the first parameter is pre-configured, or configured by network, or instructed by an upper layer, or determined by the first device.

In some embodiments, the processing module 802 is configured to: set an initial value of the first counter to be 0. The first counter is configured to record the number of times the first device rejects the sidelink DRX configuration.

In some embodiments, the first information further includes a second parameter of a first timer, the second parameter being configured to indicate a maximum duration for the first device to receive the sidelink DRX configuration.

In some embodiments, the receiving module 801 is further configured to:

receive a second parameter of a first timer from the first device, the second parameter being configured to indicate a maximum duration for the first device to receive the sidelink DRX configuration.

In some embodiments, the second parameter is pre-configured, or configured by network, or instructed by an upper layer, or determined by the first device.

In some embodiments, the processing module 802 is further configured to turn on or restart the first timer.

In some embodiments, the sending module 803 is configured to send a second information to the first device, the second information including a sidelink DRX parameter configured by the second device or the network device for the first device.

In some embodiments, the receiving module 801 is further configured to receive a first instruction information from the first device, the first instruction information being configured to indicate that the first device rejects the sidelink DRX parameter configuration.

In some embodiments, the first instruction information includes at least one of the following.

a first parameter of a first counter, the first parameter for indicating a maximum number of times the first device rejects the sidelink DRX configuration;

a current value of the first counter; and a difference between the first parameter and the current value of the first counter.

In some embodiments, the first instruction information includes at least one of the following.

a second parameter of a first timer, the second parameter for indicating a maximum duration for the first device to receive the sidelink DRX configuration;

a current value of the first timer; and a duration remaining for the first timer from timeout.

In some embodiments, the first instruction information further includes a reason for the first device to reject the sidelink DRX configuration.

In some embodiments, the first instruction information is carried in a medium access control control element (MAC CE), a PC5 radio resource control (RRC) signaling, or a physical layer signaling.

In some embodiments, the processing module 802 is further configured to add one to the current value of the first counter.

In some embodiments, the receiving module 801 is further configured to receive the first information from the first device again.

In some embodiments, the receiving module 801 is further configured to receive a second instruction information from the first device, and/or, the processing module 802 is further configured to release a sidelink with the first device; the second instruction information is configured to instruct the second device to release the sidelink with the first device.

In some embodiments, the second instruction information is carried in a PC5 secure signaling or a PC5 RRC signaling.

In some embodiments, the sending module 803 is further configured to send a fourth information to the network device, the fourth information being configured to indicate that the second device has released the sidelink with the first device.

In some embodiments, the receiving module 801 is further configured to receive a third instruction information from the first device, and/or, the processing module 802 is further configured to perform sidelink communication with the first device using a default sidelink DRX parameter; the third instruction information being configured to indicate that the first device falls back to the default sidelink DRX configuration.

In some embodiments, the default sidelink DRX parameter includes any of the following:

a sidelink DRX parameter for multicast;

a sidelink DRX parameter for unicast;

a sidelink DRX parameter for broadcast; and a sidelink DRX parameter same as a direct connection establishment request (DCR) message.

In some embodiments, the third instruction information is carried in a MAC CE, a PC5 RRC signaling, or a physical layer signaling.

In some embodiments, the sending module 803 is further configured to:

in response to the first information not including the assistance information, send a fifth information to the network device, and/or, send a second information to the first device; the fifth information being configured to indicate that the second device has not received the assistance information, and the second information including or not including the sidelink DRX configuration.

In some embodiments, the sending module 803 is further configured to:

after receiving the first information, wait for a second duration to send the fifth information to the network device; or after receiving the first information, send the fifth information directly to the network device.

In some embodiments, the sending module 803 is further configured to:

after receiving the first information, wait for a second duration to send the second information to the first device; or after receiving the first information, send the second information to the first device directly.

In some embodiments, the second duration is configured by network, or configured by the first device, or instructed by an upper layer, or a duration until the second device receives the assistance information.

The second device provided in the embodiments may be configured to perform the method performed by the second device in any of the method embodiments described above, which are similar in principle of realization and technical effect, which will not be repeated herein.

Figure 14:
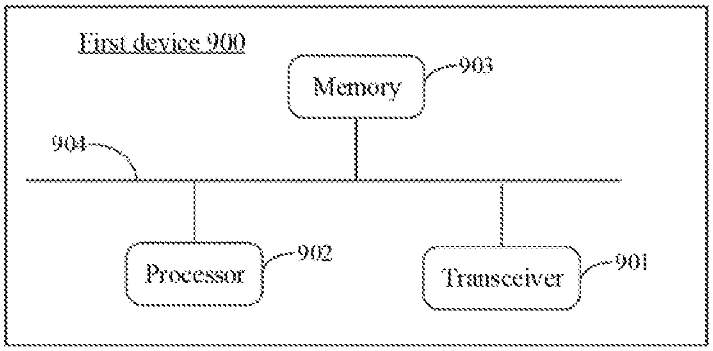
FIG. 14 is a schematic view of a hardware structure of a first device according to some embodiments of the present disclosure.

FIG. 14 is a schematic view of a hardware structure of a first device according to some embodiments of the present disclosure. As shown in FIG. 14, a first device 900 includes:

a transceiver 901, a processor 902, and a memory 903.

The memory 903 stores computer execution instructions.

The processor 902 executes the computer execution instructions stored in the memory 903, causing the processor 902 to execute the technical solution of the first device as in any of the preceding method embodiments.

In some embodiments, the memory 903 may be either stand-alone or integrated with the processor 902. When the memory 903 is a device independent of the processor 902, the electronic device 900 may further include: a bus 904 for connecting the memory 903 to the processor 902.

In some embodiments, the processor 902 may be a chip.

The present disclosure further provides a computer-readable storage medium, the computer-readable storage medium having computer-executable instructions stored therein. When the computer-executable instructions are executed by a processor, the processor is caused to implement the technical solution of the first device in any of the preceding method embodiments.

The embodiments of the present disclosure further provide a program. When the program is executed by a processor, the processor is caused to implement the technical solution of the first device in any of the preceding method embodiments.

The embodiments of the present disclosure further provide a computer program product including program instructions, the program instructions being configured to implement the technical solution of the first device in any of the preceding method embodiments.

The embodiments of the present disclosure further provide a chip including: a processing module and a communication interface, the processing module being capable of implementing the technical solution of the first device in any of the preceding method embodiments. Further, the chip further includes a storage module (e.g., a memory), the storage module for storing instructions, and the processing module for executing the instructions stored in the storage module. The execution of the instructions stored in the storage module causes the processing module to execute the technical solution of the first device.

Figure 15:
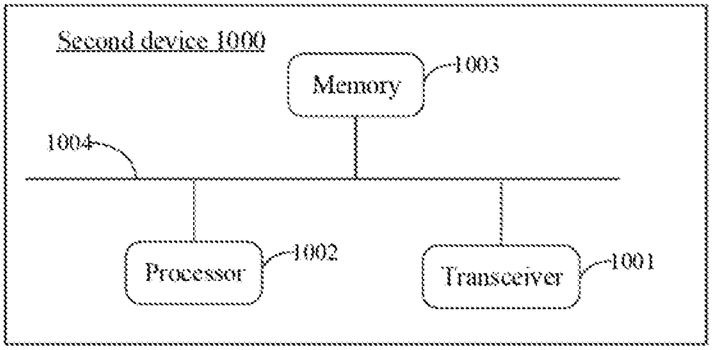
FIG. 15 is a schematic view of a hardware structure of a second device according to some embodiments of the present disclosure.

FIG. 15 is a schematic view of a hardware structure of a second device according to some embodiments of the present disclosure. As shown in FIG. 15, a second device 1000 includes:

a transceiver 1001, a processor 1002, and a memory 1003;

The memory 1003 stores computer execution instructions.

The processor 1002 executes the computer-executed instructions stored in the memory 1003, causing the processor 1002 to execute the technical solution of the second device as in any of the preceding method embodiments.

In some embodiments, the memory 1003 may be either stand-alone or integrated with the processor 1002. When the memory 1003 is a device independent of the processor 1002, the electronic device 1000 may further include: a bus 1004 for connecting the memory 1003 to the processor 1002.

In some embodiments, the processor 1002 may be a chip.

The present disclosure further provides a computer-readable storage medium, the computer-readable storage medium having computer-executable instructions stored therein. When the computer-executable instructions are executed by a processor, the processor is caused to implement the technical solution of the second device in any of the preceding method embodiments.

The embodiments of the present disclosure further provide a program. When the program is executed by a processor, the processor is caused to implement the technical solution of the second device in any of the preceding method embodiments.

The embodiments of the present disclosure further provide a computer program product including program instructions, the program instructions being configured to implement the technical solution of the second device in any of the preceding method embodiments.

The embodiments of the present disclosure further provide a chip including: a processing module and a communication interface, the processing module being capable of implementing the technical solution of the second device in any of the preceding method embodiments. Further, the chip further includes a storage module (e.g., a memory), the storage module for storing instructions, the processing module for executing the instructions stored in the storage module. The execution of the instructions stored in the storage module causes the processing module to execute the technical solution of the second device.

It is to be noted that the above division of the various modules of the first device or the second device is merely a logical functional division, and that the actual realization may be fully or partially integrated into a physical entity, or may be physically separated. And these modules may all be realized in the form of software invoked through a processing element; be realized in the form of hardware; partially in the form of software invoked through the processing element, and partially realized in the form of hardware. For example, the processing module may be a separately established processing element, or it may be realized by integrating it in a certain chip of the above apparatus, and furthermore, it may be stored in the form of a program code in the memory of the above apparatus, which is invoked by a certain processing element of the above apparatus and carries out the functions of the determining module. Other modules are realized similarly. In addition, all or some of these modules may be integrated together or may be realized independently. The processing element described herein may be an integrated circuit with signal processing capability. In the realization, the steps of the method described above or each of the above modules may be accomplished by integrated logic circuits of hardware in the processor element or by instructions in the form of software.

For example, these modules may be one or more integrated circuits configured to implement the method described above, such as: one or more application specific integrated circuits (ASICs), one or more microprocessors (digital signal processors (DSPs), or one or more field programmable gate arrays (FPGAs), etc. For example, when one of the above modules is implemented in the form of a processing element scheduling a program code, the processing element may be a general purpose processor, such as a central processing unit (CPU) or other processor that can invoke the program code. Further, the modules may be integrated together and implemented as a system-on-a-chip (SOC).

In the above embodiments, the implementation may be in whole or in part by software, hardware, firmware, or any combination thereof. When implemented using software, it may be implemented in whole or in part in the form of a computer program product. The computer program product includes one or more computer instructions. Loading and executing the computer program instructions on a computer produces, in whole or in part, a process or function in accordance with the embodiments of the present disclosure. The computer may be a general-purpose computer, a specialized computer, a computer network, or other programmable device. The computer instructions may be stored in a computer-readable storage medium or transmitted from one computer-readable storage medium to another computer-readable storage medium, e.g., the computer instructions may be transmitted by wired (e.g., coaxial cable, fiber optic, digital subscriber line (DSL)) or wireless (e.g., infrared, wireless, microwave, etc.) means from one website site, computer, server, or data center to another website site, computer, server or data center. The computer-readable storage medium may be any usable medium to which a computer has access or a data storage device such as a server, data center, etc. containing one or more usable media integrated. The usable medium may be a magnetic medium (e.g., floppy disk, hard disk, tape), an optical medium (e.g., DVD), or a semiconductor medium (e.g., solid state disk solid state disk (SSD)), and the like.

In the present disclosure, "at least two" means two or more, and "more than one" means two or more. The character "and/or" describes an association relationship of associated objects, indicating that three relationships may exist, for example, A and/or B, which may indicate: the existence of A alone, the existence of both A and B, and the existence of B alone, where A and B may be singular or plural. The character "/" generally indicates that the objects associated before and after are in an "or" relationship; in the formula, the character "/", indicates that the objects associated before and after are in a relationship of "division". "at least one of the following" or its similar expression, refers to any combination of these items, including a single item or plural items of any combination. For example, at least one of a, b, or c, may be expressed as: a, b, c, a-b, a-c, b-c, or a-b-c, where a, b, and c may be single or multiple.

It will be appreciated that the various numerical numbers involved in the embodiments of the present disclosure are only distinctions made for descriptive convenience and are not intended to limit the scope of the present disclosure.

It is to be understood that in the embodiments of the present disclosure, the serial numbers of the above processes do not imply the order of execution, and the order of execution of the processes shall be determined by their functions and inherent logic without constituting any limitation to the implementation process of the embodiments of the present disclosure.

The foregoing is only specific embodiments of the present disclosure, but the scope of the present disclosure is not limited thereto. Any changes or substitutions that can be readily thought of by those skilled in the art within the scope of the technology disclosed in the present disclosure shall be covered by the scope of the present disclosure. Therefore, the scope of the present disclosure shall be subject to the scope of the stated claims.

What is claimed is:

1. A resource allocation method, performed by a first device and comprising:

sending first information to a second device; wherein the first information comprises assistance information, the assistance information comprising at least one sidelink discontinuous reception (DRX) parameter indicated by the first device; and the first information is configured for the second device or a network device to configure a sidelink DRX parameter for the first device;

wherein the assistance information comprising at least one sidelink DRX parameter indicated by the first device comprises:

a plurality of sidelink DRX parameter sets, wherein each sidelink DRX parameter set comprises a value range or a value of each sidelink DRX parameter in the sidelink DRX parameter set;

wherein the method further comprises:

receiving second information from the second device; wherein the second information comprises the sidelink DRX parameter configured by the second device or the network device for the first device; and sending first instruction information to the second device in response to determining to reject a configuration of the sidelink DRX parameter; wherein the first instruction information is configured to indicate that the first device rejects the configuration of the sidelink DRX parameter, and the first instruction information comprises at least one of:

a first parameter of a first counter, the first parameter for indicating a maximum number of times the first device rejects a sidelink DRX configuration;

a current value of the first counter; or a difference between the first parameter and the current value of the first counter.

2. The method according to claim 1, wherein the assistance information comprising at least one sidelink DRX parameter indicated by the first device further comprises:

any one of the following data for each of the at least one sidelink DRX parameter:

a maximum value of each sidelink DRX parameter;

a minimum value of each sidelink DRX parameter;

a maximum value and a minimum value of each sidelink DRX parameter;

a preset value and a float coefficient of each sidelink DRX parameter; or a value set for each sidelink DRX parameter, the value set comprising at least one value.

3. The method according to claim 1, wherein the first instruction information further comprises at least one of:

a second parameter of a first timer, the second parameter for indicating a maximum duration for the first device to receive a sidelink DRX configuration;

a current value of the first timer; or a duration remaining for the first timer from timeout.

4. The method according to claim 1, wherein the first instruction information is carried in a medium access control control element (MAC CE), a PC5 radio resource control (RRC) signaling, or a physical layer signaling.

5. The method according to claim 1, further comprising:

sending second instruction information to the second device, and/or, releasing a sidelink with the second device; wherein the second instruction information is configured to instruct the second device to release the sidelink with the first device.

6. The method according to claim 5, wherein the sending second instruction information to the second device, and/or, releasing a sidelink with the second device comprises:

sending the second instruction information to the second device, and/or, releasing the sidelink with the second device, in response to any one of first conditions being met;

wherein the first conditions comprise that: a current value of a first counter is greater than a first parameter of the first counter; or a first timer times out; or the first device determines according to its own implementation.

7. The method according to claim 1, further comprising:
sending third instruction information to the second device, and/or, setting the sidelink DRX parameter of the first device to a default sidelink DRX parameter;
wherein the third instruction information is configured to indicate that the first device falls back to a default sidelink DRX configuration.

8. The method according to claim 7, wherein the sending third instruction information to the second device, and/or, setting the sidelink DRX parameter of the first device to a default sidelink DRX parameter comprises:
sending the third instruction information to the second device, and/or, setting the sidelink DRX parameter of the first device to the default sidelink DRX parameter, in response to any one of first conditions being met;
wherein the first conditions comprise that: a current value of a first counter is greater than a first parameter of the first counter; or a first timer times out; or the first device determines according to its own implementation.

9. A resource allocation method, performed by a second device and comprising:
receiving first information from a first device; wherein the first information comprises assistance information, the assistance information comprising at least one sidelink discontinuous reception (DRX) parameter indicated by the first device; and the first information is configured for the second device or a network device to configure a sidelink DRX parameter for the first device;
wherein the assistance information comprising at least one sidelink DRX parameter indicated by the first device comprises:
a plurality of sidelink DRX parameter sets, wherein each sidelink DRX parameter set comprises a value range or a value of each sidelink DRX parameter in the sidelink DRX parameter set;
wherein the method further comprises:
sending second information to the first device; wherein the second information comprises the sidelink DRX parameter configured by the second device or the network device for the first device;
receiving first instruction information from the first device; wherein the first instruction information is configured to indicate that the first device rejects a configuration of the sidelink DRX parameter, and the first instruction information comprises at least one of:
a first parameter of a first counter, the first parameter for indicating a maximum number of times the first device rejects a sidelink DRX configuration;
a current value of the first counter; or
a difference between the first parameter and the current value of the first counter.

10. The method according to claim 9, wherein the assistance information comprising at least one sidelink DRX parameter indicated by the first device further comprises:
any one of the following data for each of the at least one sidelink DRX parameter:
a maximum value of each sidelink DRX parameter;
a minimum value of each sidelink DRX parameter;
a maximum value and a minimum value of each sidelink DRX parameter;
a preset value and a float coefficient of each sidelink DRX parameter; or
a value set for each sidelink DRX parameter, the value set comprising at least one value.

11. The method according to claim 9, wherein the first instruction information is carried in a medium access control control element (MAC CE), a PC5 radio resource control (RRC) signaling, or a physical layer signaling.

12. The method according to claim 9, further comprising:
in response to the first information not comprising the assistance information, sending fifth information to the network device, and/or, sending second information to the first device; wherein the fifth information is configured to indicate that the second device has not received the assistance information, and the second information comprises or does not comprise a sidelink DRX configuration.

13. A first device, comprising:
a transceiver, a processor, and a memory;
wherein the memory stores a computer-executable instruction;
the processor is configured to execute the computer-executable instruction stored in the memory, to be caused to perform:
sending first information to a second device; wherein the first information comprises assistance information, the assistance information comprising at least one sidelink discontinuous reception (DRX) parameter indicated by the first device; and the first information is configured for the second device or a network device to configure a sidelink DRX parameter for the first device;
wherein the assistance information comprising at least one sidelink DRX parameter indicated by the first device comprises:
a plurality of sidelink DRX parameter sets, wherein each sidelink DRX parameter set comprises a value range or a value of each sidelink DRX parameter in the sidelink DRX parameter set;
wherein the processor is configured to execute the computer-executable instruction stored in the memory, to be caused to further perform:
receiving second information from the second device; wherein the second information comprises the sidelink DRX parameter configured by the second device or the network device for the first device; and
sending first instruction information to the second device in response to determining to reject a configuration of the sidelink DRX parameter; wherein the first instruction information is configured to indicate that the first device rejects the configuration of the sidelink DRX parameter, and the first instruction information comprises at least one of:
a first parameter of a first counter, the first parameter for indicating a maximum number of times the first device rejects a sidelink DRX configuration;
a current value of the first counter; or
a difference between the first parameter and the current value of the first counter.

14. The first device according to claim 13, wherein the assistance information comprising at least one sidelink DRX parameter indicated by the first device further comprises:
any one of the following data for each of the at least one sidelink DRX parameter:
a maximum value of each sidelink DRX parameter;
a minimum value of each sidelink DRX parameter;
a maximum value and a minimum value of each sidelink DRX parameter;
a preset value and a float coefficient of each sidelink DRX parameter; or
a value set for each sidelink DRX parameter, the value set comprising at least one value.

15. The first device according to claim 13, wherein the first instruction information further comprises at least one of:

a second parameter of a first timer, the second parameter for indicating a maximum duration for the first device to receive a sidelink DRX configuration;

a current value of the first timer; or a duration remaining for the first timer from timeout.

16. The first device according to claim 13, wherein the first instruction information is carried in a medium access control control element (MAC CE), a PC5 radio resource control (RRC) signaling, or a physical layer signaling.

17. The first device according to claim 13, wherein the processor is configured to execute the computer-executable instruction stored in the memory, to be caused to further perform:

sending second instruction information to the second device, and/or, releasing a sidelink with the second device; wherein the second instruction information is configured to instruct the second device to release the sidelink with the first device.

18. The first device according to claim 17, wherein the processor is configured to execute the computer-executable instruction stored in the memory, to be caused to further perform:

sending the second instruction information to the second device, and/or, releasing the sidelink with the second device, in response to any one of first conditions being met;

wherein the first conditions comprise that: a current value of a first counter is greater than a first parameter of the first counter; or a first timer times out; or the first device determines according to its own implementation.

19. The first device according to claim 13, wherein the processor is configured to execute the computer-executable instruction stored in the memory, to be caused to further perform:

sending third instruction information to the second device, and/or, setting the sidelink DRX parameter of the first device to a default sidelink DRX parameter; wherein the third instruction information is configured to indicate that the first device falls back to a default sidelink DRX configuration.

20. The first device according to claim 19, wherein the processor is configured to execute the computer-executable instruction stored in the memory, to be caused to further perform:

sending the third instruction information to the second device, and/or, setting the sidelink DRX parameter of the first device to the default sidelink DRX parameter, in response to any one of first conditions being met;

wherein the first conditions comprise that: a current value of a first counter is greater than a first parameter of the first counter; or a first timer times out; or the first device determines according to its own implementation.

* * * * *